(12) United States Patent
Zhang et al.

(10) Patent No.: US 12,381,814 B2
(45) Date of Patent: Aug. 5, 2025

(54) INFORMATION CENTRIC NETWORK DISTRIBUTED PATH SELECTION

(71) Applicant: Intel Corporation, Santa Clara, CA (US)

(72) Inventors: Yi Zhang, Portland, OR (US); Hao Feng, Hillsboro, OR (US); Srikathyayani Srikanteswara, Portland, OR (US); Nageen Himayat, Fremont, CA (US); Xiruo Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 698 days.

(21) Appl. No.: 17/559,577

(22) Filed: Dec. 22, 2021

(65) Prior Publication Data

US 2022/0116315 A1    Apr. 14, 2022

Related U.S. Application Data

(60) Provisional application No. 63/173,830, filed on Apr. 12, 2021, provisional application No. 63/173,860, filed on Apr. 12, 2021.

(51) Int. Cl.
| | |
|---|---|
| H04L 45/00 | (2022.01) |
| H04L 43/12 | (2022.01) |
| H04L 45/24 | (2022.01) |
| H04L 45/44 | (2022.01) |

(52) U.S. Cl.
CPC ............. *H04L 45/26* (2013.01); *H04L 43/12* (2013.01); *H04L 45/24* (2013.01); *H04L 45/44* (2013.01)

(58) Field of Classification Search
CPC ......... H04L 45/26; H04L 43/12; H04L 45/24; H04L 45/44
USPC ........................................................ 370/389
See application file for complete search history.

(56) References Cited

U.S. PATENT DOCUMENTS

| | | | | |
|---|---|---|---|---|
| 11,792,113 | B2 * | 10/2023 | Himayat ................. | H04L 47/31 370/392 |
| 2008/0192724 | A1 * | 8/2008 | Kondo ..................... | H04L 47/25 370/345 |
| 2009/0052321 | A1 * | 2/2009 | Kamath ............... | H04W 40/246 370/235 |
| 2011/0158099 | A1 * | 6/2011 | Fujita ..................... | H04W 40/12 370/242 |

(Continued)

FOREIGN PATENT DOCUMENTS

| | | | | |
|---|---|---|---|---|
| DE | 102022202570 | | 10/2022 | |
| KR | 102211796 B1 * | | 2/2021 | ............ H04W 84/18 |

OTHER PUBLICATIONS

"NFD Developer's Guide", (2016), 73 pgs.

(Continued)

*Primary Examiner* — Faisal Choudhury
(74) *Attorney, Agent, or Firm* — Schwegman Lundberg & Woessner, P.A.

(57) ABSTRACT

System and techniques for information centric network (ICN) distributed path selection are described herein. An ICN node transmits a probes message to other ICN nodes. The ICN node receives a response to the probe message and derives a path strength metric from the response. Later, when a discovery packet is received by the ICN node, the path strength metric is added to the discovery packet.

24 Claims, 19 Drawing Sheets

(56) References Cited

U.S. PATENT DOCUMENTS

| | | | |
|---|---|---|---|
| 2012/0092984 A1* | 4/2012 | Mighani | H04W 84/00 |
| | | | 370/255 |
| 2019/0327340 A1* | 10/2019 | Alam | H04L 67/10 |
| 2020/0244728 A1* | 7/2020 | Jha | H04L 9/30 |
| 2022/0141708 A1* | 5/2022 | Arrobo Vidal | H04L 69/22 |
| | | | 370/329 |
| 2022/0158934 A1* | 5/2022 | Himayat | H04L 45/745 |

OTHER PUBLICATIONS

Alawi, Mahmoud Abdulwahab, "Simplified gateway selection scheme for multihop relay in vehicular ad hoc network", International Journal of Communication Systems, vol. 27, No. 12 pp. 3855-3873, (2014), 20 pgs.

Bouk, Safdar Hussain, "An optimum multiple metrics gateway selection mechanism in MANET and infrastructure networks integration", Wireless Communications and Networking Conference, (2008), 7 pgs.

De Couto, D, "High-Throughput Routing for Multi-Hop Wireless Networks", PHD thesis, Massachusetts Institute of Technology, USA, (2004), 119 pgs.

Draves, Richard, "Routing in Multi-Radio Multi-Hop Wireless Mesh Networks", Proc. ACM MobiCom '04, Philadelphia, PA, (Sep. 2004), 15 pgs.

* cited by examiner

INFORMATION CENTRIC NETWORK DISTRIBUTED PATH SELECTION

CLAIM OF PRIORITY

This patent application claims the benefit of priority to U.S. Provisional Application Ser. No. 63/173,830, titled "DYNAMIC ORCHESTRATION IN DISTRIBUTED WIRELESS EDGE NETWORK" and filed on Apr. 12, 2021, and also claims priority to United States Provisional Application Ser. No. 63/173,860, titled "ENHANCED DISTRIBUTED PATH SELECTION MECHANISM IN NAMED DATA NETWORKING (NDN)" and filed on Apr. 12, 2021, the entirety of all are hereby incorporated by reference herein.

TECHNICAL FIELD

Embodiments described herein generally relate to information centric networking and more specifically to information centric network distributed path selection.

BACKGROUND

Information centric networking (ICN) is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
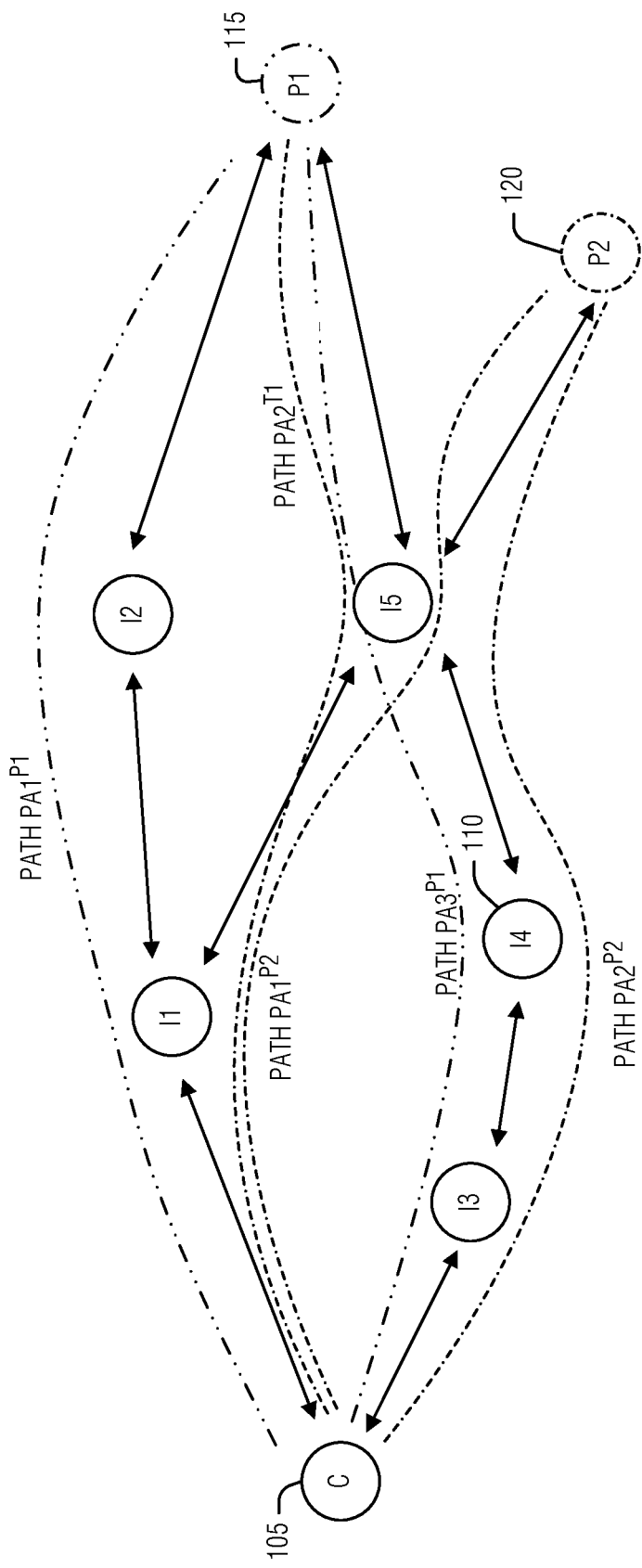
FIG. 1 is a block diagram of an example of an environment including a system for capability discovery in an ICN.

Compute resources are increasingly moving close to users to satisfy the emerging requirements of next-generation network service applications. More and more data are being generated at the edge. Following this trend, with intelligence, decision making, and compute also moving to the edge, often into hybrid clouds and client edge devices. Those applications that rely on the edge for satisfactory performance comprise a class of Edge-Dependent Applications (EDAs). These applications may incorporate clients that are either mobile (e.g., smartphones or on-vehicle sensors) or static (e.g., urban cameras, base stations, roadside units (RSUs)). EDAs represent a significant opportunity to bring computing closer to where the results are use because EDAs involve an optimized combination of edge computing, networking, data, storage, or graphics. These uses of the edge offer challenges as the edge is often a dynamic network with heterogeneous resources that may be limited, and computational needs may change quickly. Dynamism in computing requests may result from mobility, wireless link conditions, energy efficiency goals, or changing contexts among others. To meet these needs, edge services generally need to be loaded or instantiated quickly as the need arises.

Distributed computing networking paradigms facilitate the services available for processing at nearby compute resources—e.g., compute servers, access points, or end devices near users. Sophisticated implementations involve different services—such as computing resources, raw data, functions or software, etc.—being made available in different nodes. Orchestrating various services at different nodes in a dynamic environment presents several challenges. In wireless a multi-hop network, in which radio link quality may continuously change, there may be multiple wireless multi-hop paths leading to each service provider. Here, optimizing total latency, including time spent on resource discovery, transmission of service invocation, and computation, is a present challenge.

To address the issue of selecting network paths to varying resources (e.g., hosted at various nodes) in an edge network, a distributed path selection mechanism may be used to optimize end-to-end transmission latency. Because ICNs are a natural fit for distributed real-time edge compute networks, the examples herein present an ICN-based distributed path selection technique for dynamically discovering and composing different resources to finish a task. The disclosed distributed path selection technique addresses several issues in distributed path execution. For example, the technique enables selection of a service provider among multiple service providers that has a good (e.g., the best) chance to execute a service provision and through which path the service invocation request or response will be sent. This is accomplished by considering both a node's capability and the robustness of the path to the node. Path robustness may be evaluated using several metrics formulated by participants in the network. Thus, using path robustness metrics, nodes with similar capabilities may be ordered to select those nodes that not only may complete the task, but probably do so with minimal latency. Further, by using the capability discovery technique described herein, discovery efficiency may be improved over other techniques. This may further reduce latencies in edge network task orchestration.

Some attempts to address path latency have included distributed schemes of choosing remote gateways to access networks by calculating a composite score metric developed based on different sub-matrices. For example, discovered hop counts and gateway capabilities, such as remaining energy level, radio signal strength connecting to the network, etc. This may be referred to as a minimal hop count. Minimal hop count is a widely used route metric. Generally, the fewer hop counts, the shorter transmission latency. This technique works well in fixed networks. However, minimal hop count performs poorly wireless ad-hoc networks where the radio channel is unstable and environment changes quickly due to mobility. Paths found by the minimal hop count may have poor performance because they tend to choose wireless links between distant nodes. These long wireless links may be slow and lossy leading to more retransmissions and poor throughput performance. Therefore, hop count alone generally does not provide the optimal approximation on transmission latency.

Expected Transmission Count (ETX) tends to find paths with the fewest expected number of transmissions, including retransmissions, required to deliver a packet to its destination. The metric predicts the number of retransmissions using per-link measurements of packet loss ratios in both directions of each wireless link. The primary goal of the ETX design is to find paths with high throughput on both directions despite losses. The ETX target—to find a route with the optimal packet loss ratios over reciprocal directions of wireless links—is applicable only in scenarios with symmetric transmission data volume on the forward and reverse links. Thus, the sizes of the outbound packets and return packets are the same. However, in most cases this assumption does not hold. For example, acknowledgments (ACKs) are typically much smaller than that of the data. This is particularly true when data chunks (e.g., a group of data) are transmitted from a data producer to a compute node or from a compute node to the data consumer.

Expected transmission time (ETT) is another technique that tends to find a path with the smallest transmission cost. The smallest transmission cost is derived from an instant capacity of all links. The cost of the link over hop n is represented by the metric $1/C_n$ that is then accumulated over all links. ETT, however, uses an additive white Gaussian noise (AWGN) channel to model the link and does not take interference or fading into consideration. Meanwhile the expected transmission time is calculated based on instant signal to noise ratio, which is applied only to the AWGN channel.

In default Named Data Networking (NDN) implementations, a discovery interest packet is flooded into the network if the consumer or the intermediate nodes do not have knowledge of a good route in a forward information base (FIB). Once the interest reaches a node with the named resource, the discovery process stops, and a data packet is sent back. This discovery process generally continues until the resource is found or a time out is reached. This design works well for data fetching because it typically eliminates duplicate data responses sent from different producers to the consumer. However, the technique limits its usage in edge computing. For example, a consumer usually attempts to find more than one compute node within a predefined time window to have options from which to select the best compute node.

To address the issue above regarding path metrics used to discriminate between producers, the present technique employs two metrics to reflect the end-to-end transmission latency over a multi-hop path. The first metric (Metric 1) may be derived from an estimated transmission success probability over the links of the entire path. The second metric (Metric 2) may be derived from an expected maximum transmission rate over the links of the entire path. In an example, one or both metrics use a unidirectional link status to reflect the asymmetric transmission data volume that is the most common scenario in real network implementations. In an example, the two metrics may be combined, resulting in a hybrid metric.

FIG. 1 is a block diagram of an example of an environment including a system for capability discovery in an ICN, according to an embodiment. As illustrated, various ICN nodes are connected via several different paths. The consumer node 105 shares various paths (PAn) to producer nodes (P), such as producer node P1 115 and producer node P2 120 through various intermediary nodes In, such as node I4 110. The consumer node 105 may have tasks waiting to be executed. Due to lack of local compute resources, the consumer node 105 is looking for additional compute nodes to execute the tasks. The consumer node 105 sends out a discovery request (e.g., an interest packet with a name prefix or a flag indicating that it is a discovery packet) to discover available compute resources in the neighborhood (e.g., nodes connected via a threshold or fewer hops). In the illustrated scenario, the consumer node 105 obtains awareness of multiple producers, producer node P1 115 and producer node P2 120, that are available to provide compute resources. For each of the producer nodes, there are multiple paths to the consumer node 105. The paths are Path $PAn^{P1}$, where n=[1,2,3] and Path $PAn^{P2}$, where n=[1,2] respectively for the producer node P1 115 and the producer node P2 120.

To facilitate path metrics during discovery, the nodes (e.g., the node four 110) may periodically broadcast probe messages to neighbor nodes to observe link conditions. The probe messages are small, usually carrying only enough information to identify it as a probe message and enable measurement of the link characteristics. Generally, for the node four 110, the observation of one-hop neighbor link information is measured by the reception of the probe messages. In wireless scenarios, the intermediary nodes (I) may observe the reception status—such as success, failure, a signal to noise ratio (SINR), etc.—of the probe messages and estimate the link status. From these measurements, a one-hop link transmission success probability or an expected maximum transmission rate may be derived (e.g., from each neighbor) by averaging an instant link status through multiple receptions of the probe messages within a time period (e.g., window or time window). Details about each of Metric 1 and Metric 2 are described below.

For Metric 1, each node i estimates the transmission success probability of the backward link from each neighbor j—represented as $P_{ji}(t)$—by recording and averaging successful transmission counts experienced during probe message transmissions. In an example, the measurements occur during a moving-window-sized period w. If $m_{ji}(t)$ represents the number of probe messages received by node i from neighbor j in the time window w from time t−w+1 to time t, then the link abstract distance from node j to node i at slot t may be represented as $L_{ij}(t)=1/P_{ji}(t)$, where $$P_{ji}(t) = \frac{m_{ji}(t)}{n_j(t)}$$

assuming there are $n_j(t)$ probe messages transmitted by node j in the moving time window from time t−w+1 to time t.

For Metric 2, each node i estimates the expected maximum transmission rate of the backward link from neighbor j—represented as $\overline{C}_{ji}$—by recording and averaging channel realizations experienced during the probe message transmissions. In an example, the average is taken over a moving-window as discussed above. In this case, the link abstract distance from node j to node i at time slot t is may be represented as $L_{ji}(t)=1/\overline{C}_{ji}(t)$, where $$\overline{C}_{ji}(t) = \frac{1}{m_{ji}(t)} \sum_{k=1}^{m_{ji}(t)} \log(1 + SNR_{ji}(k)).$$

The result stands for the average of the channel realizations experienced by receiving probe messages within the moving window with size w ending at time t.

In an example, Metric 1 and Metric 2 may be combined to produce a hybrid metric. In an example, combination is performed via Simple Additive Weighting (SAW). Here, the hybrid metric is a weighted sum of all of the metric values. In an example, the accumulated abstract distance between consumer and producer over path R is $\Sigma_{(j,i)\in R} L_{ji}$, calculated as:

$$\sum_{(j,i)\in R} L_{ji} = \begin{cases} \sum_{(j,i)\in R} 1/P_{ji}, & \text{for Metric 1} \\ \sum_{(j,i)\in R} 1/\overline{C}_{ji}, & \text{for Metric 2} \end{cases}$$

Generally, when used alone, Metric 1 provides better performance than Metric 2. Further, Metric 1 tends to be simpler to implement because calculating Metric 1 does not use cross-layer information. However, both metrics alone, or in combination, outperform other techniques for path robustness estimation in certain network environments. In general, the path robustness metric is applicable to all scenarios in which the multi-hop transmission latency dominates the end-to-end service delivery latency that includes both service processing time and data transmission time.

The following examples illustrate the technique from the perspective of the node four 110. The node four 110 includes hardware—such as a memory, processing circuitry, and network interfaces—used to perform the operations. Thus, the node four 110 includes processing circuitry configured to transmit, via a network interface (e.g., face) a probe message is sent to other ICN nodes, such as the node five. The processing circuitry is configured to receive a response to the probe message via the network interface.

The processing circuitry is configured to derive a path strength metric (e.g., path robustness) from the response. In an example, deriving the path strength metric includes calculating a transmission success probability metric based on the response. Here, the transmission success probability simply counts the number of probes or responses that were successfully received. Thus, very noisy or incoherent links will generally experience low transmission success probabilities due to lost, garbled, or otherwise unsuccessful packets. In an example, the transmission success probability metric corresponds to a backward link from the neighbor ICN node to the node four 110. In an example, to calculate the transmission success probability metric, the processing circuitry is configured to average successful transmission counts across multiple probe messages to a neighbor ICN node. In an example, the averaging is taken over a moving window time period. These examples relate to Metric 1.

In an example, to derive the path strength metric, the processing circuitry is configured to calculate an expected maximum transmission rate metric based on the response. In an example, to calculate the expected maximum transmission rate metric includes averaging channel realizations across multiple probe messages to a neighbor ICN node. The channel realizations measure throughput (e.g., bandwidth) over a time period. Thus, while the previous metric focused on the link stability, this metric accounts for the ability of the link to handle a particular size of data. In an example, the expected maximum transmission rate metric corresponds to a backward link from the neighbor ICN node to the node four 110.

In an example, the average of the channel realizations across the multiple probe messages is taken is over a moving window time period. In an example, the expected maximum transmission rate metric $\overline{C}_{ij}$ is calculated by:

$$\overline{C}_{ij}(t) = \frac{1}{m_{ji}(t)} \sum_{k=1}^{m_{ji}(t)} \log(1 + SNR_{ji}(k))$$

where $m_{ji}(t)$ are a number of responses received from neighbor ICN node j corresponding to a probe message from the ICN node i in time period t. These examples relate to Metric 2.

In an example, to derive the path strength metric, the processing circuitry is configured to calculate a transmission success probability metric based on the response, calculating an expected maximum transmission rate metric based on the response, and combining the transmission success probability metric and the expected maximum transmission rate to create the path strength metric. This example represents the hybrid metric. In an example, combining the transmission success probability metric and the expected maximum transmission rate metric includes using a Simple Additive weighting (SAW).

As the previous metrics are derived from the continual probe messaging of the nodes, the metrics are available to the node four 110 (and other nodes) to facilitate discovery from the consumer node 105. Thus, in an example, the node four 110 is configured to receive (e.g., via a network interface) a discovery packet. In an example, the discovery packet is an interest packet.

The processing circuitry is configured to add the path strength metric to the discovery packet. In an example, the path strength metric is added prior to forwarding the discovery packet. In an example, adding the path strength metric to the discovery packet includes extracting a path strength value from the discovery packet, adding the path strength metric to the path strength value to create a modified path strength value, and replacing the path strength value in the discovery packet with the modified path strength value. Thus, the links to neighbors of the node four 110 are appended to other path strength metrics of, for example, the node three, to assemble a complete path strength metric from the producer node P2 120 to the consumer node 105, for example.

Figure 2:
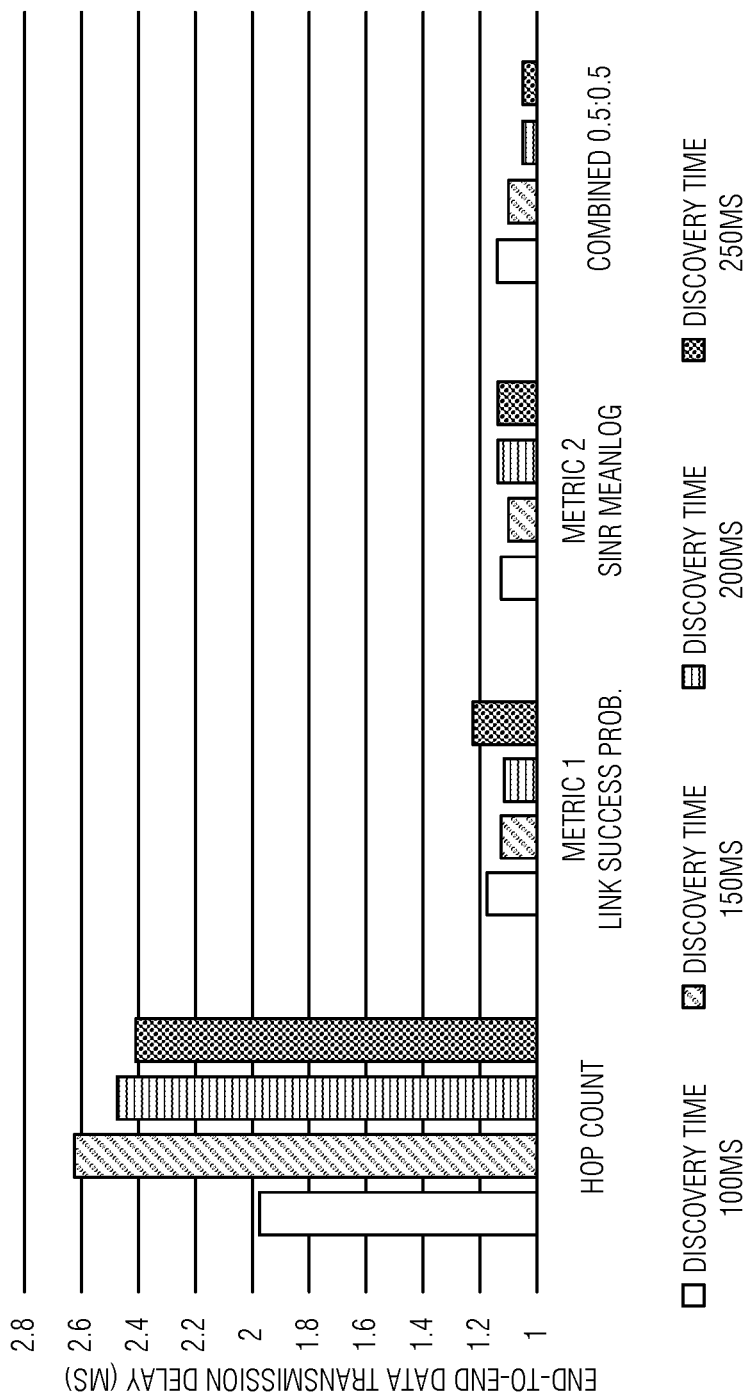
FIG. 2 is a chart of performance evaluations with minimal hop count.

FIG. 2 is a chart of performance evaluations with minimal hop count (transmission latency only). The illustrated performance comparison is on end-to-end transmission latency between Metric 1, Metric 2, the hybrid metric, and the minimal hop count under different discovery times. As illustrated, the metrics disclosed herein perform better than the minimal hop count, the performance of which varies significantly as discovery time increases in contrast to the stable performance of the metrics disclosed herein.

Figure 3:
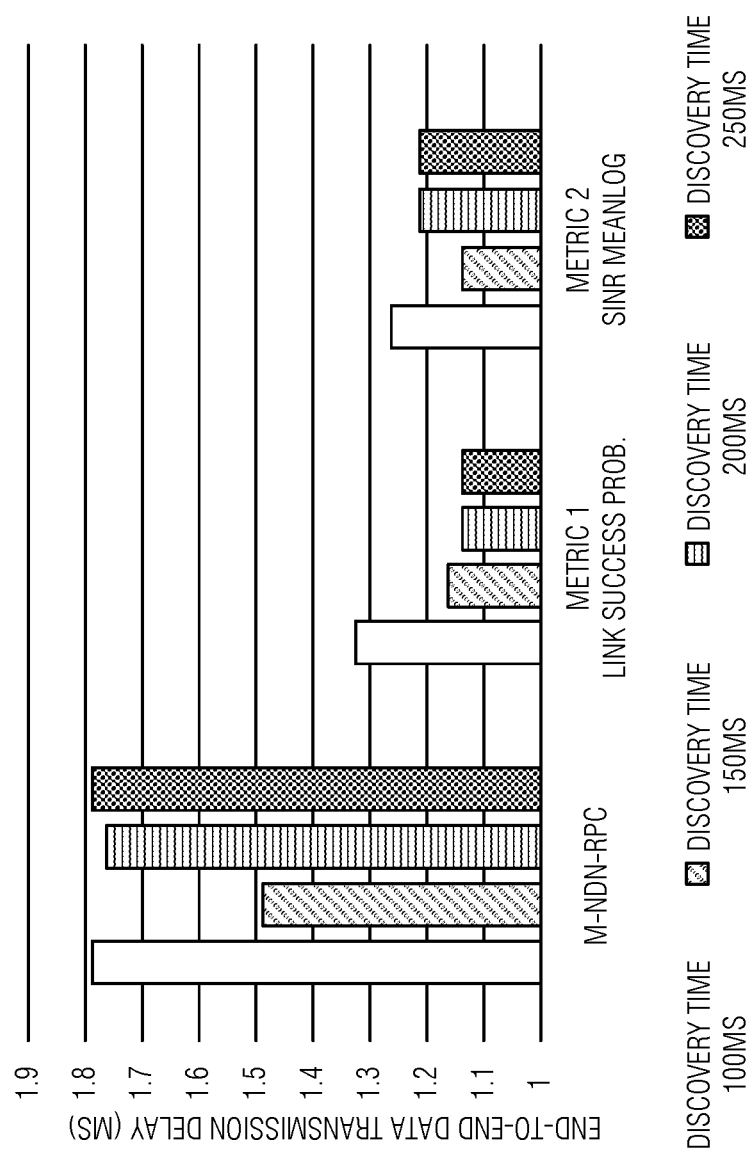
FIG. 3 is a chart of a performance comparison with M-NDN-RPC.

FIG. 3 is a chart of a performance comparison with M-NDN-RPC (transmission latency only) under different discovery times. In M-NDN-RPC multiple discovery data packets may be forwarded back to the consumer node 105. That is, intermediate nodes may keep forwarding data packets even if they have already forwarded a data packet back. This enables the consumer node 105 to discover more than one producer in an ICN. In general, under M-NDN-RPC, if the consumer node 105 receives only one discovery data packet, the producer selection is done. When receiving multiple discovery data packets, the consumer node 105 selects the producer with the highest computation resource. As illustrated, experimental results indicate that the disclosed metrics provide much more stable performance than M-NDN-RPC.

Figure 4:
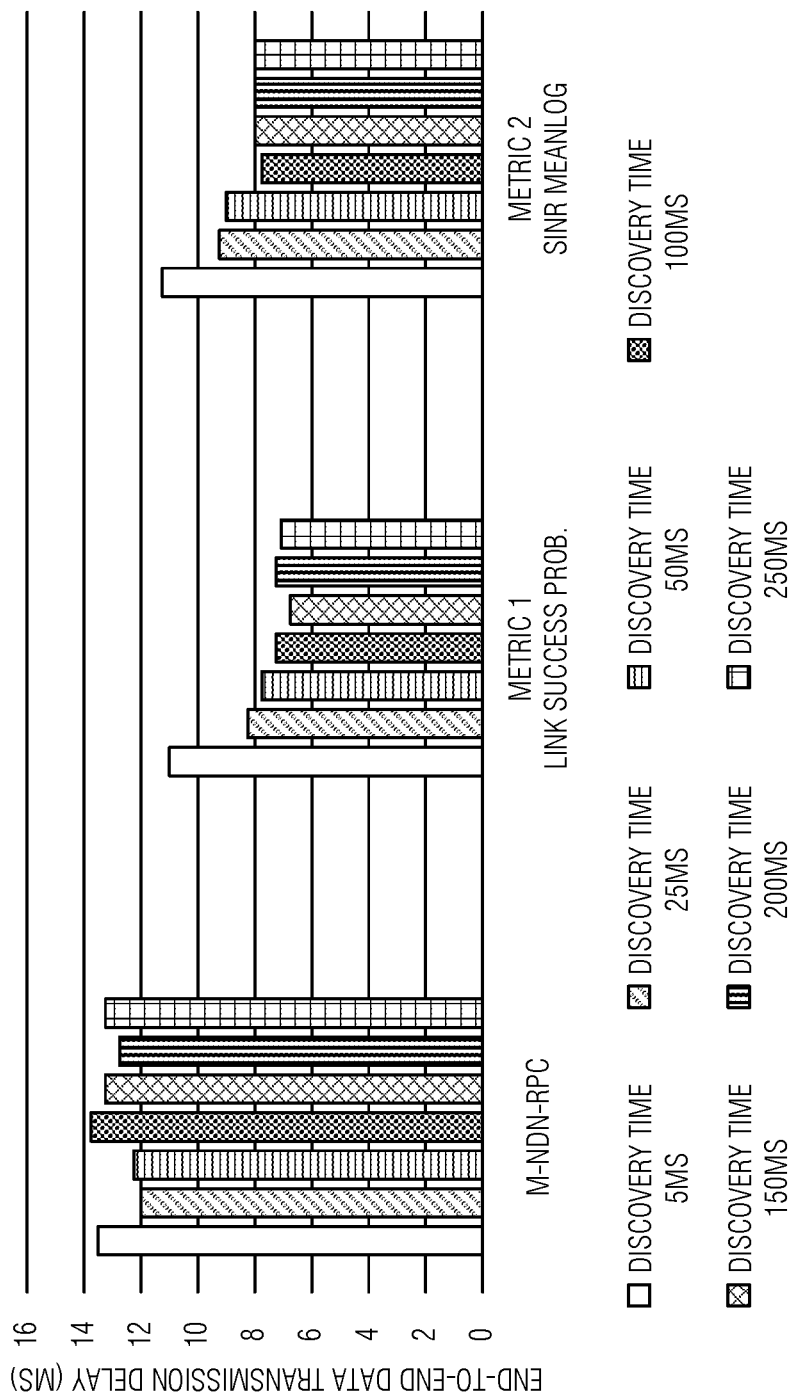
FIG. 4 is a chart of total latency under different discovery times.

FIG. 4 is a chart of total latency (transmission+computation) under different discovery times. The total latency may be assisted by the server capability discovery technique described herein, which may greatly improve the discovery efficiency, especially under extremely short discovery timeouts. Thus, the illustrated total latency includes the time on resource discovery, transmission of service invocation, and computation. Again, the improvement of the techniques described herein over M-NDN-RPC is evident.

The data to compute Metric 2, such as SINR, is generally gathered from the physical layer of the network stack. This often involves an extra cross-layer information exchange when compared to Metric 1 because Metric 1 simply calculates the transmission success rate.

Figure 5:
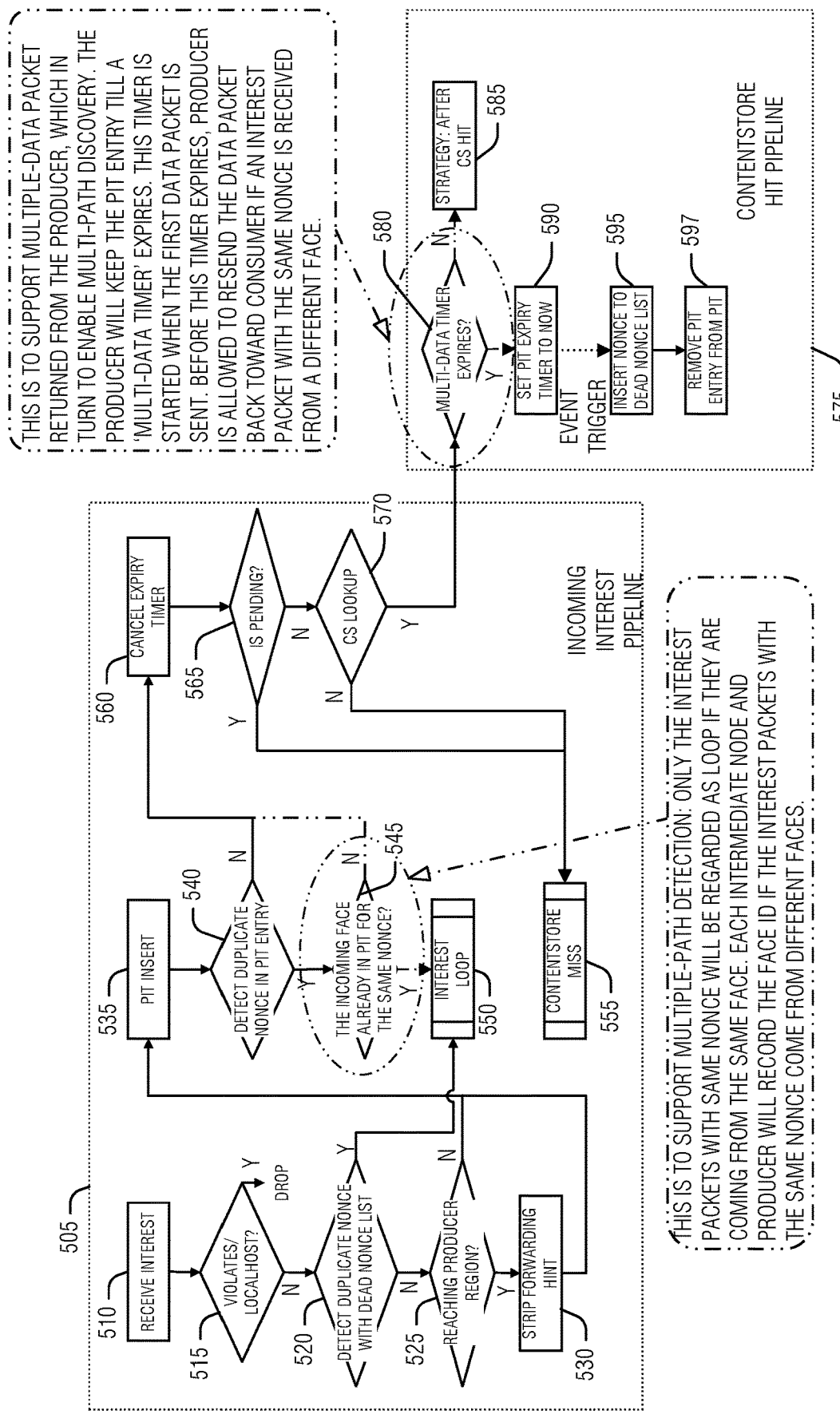
FIG. 5 illustrates an enhanced content store hit pipeline within an incoming interest pipeline.

FIG. 5 illustrates an enhanced content store hit pipeline within an incoming interest pipeline. Traditional ICN is designed for data fetching, attempting to eliminate duplicate data sent back from different producers to the consumer node 105. This behavior may limit ICN efficacy in edge orchestration because the consumer node 105 benefits from finding more than one producer node within a predefined time window to select the best one. Modifying the discovery mechanism (e.g., special interest packets that enable forward propagation based on a termination condition other than a producer node meeting the requirements, and relaying responsive data packets—e.g., PIT entries that enable more than one matching data packet to pass back to the consumer node 105—support multiple producers node discovery. However, such techniques are generally limited to single path information to the producer nodes because only replies to the first received interest packet are forwarded; the rest of the interests received afterward from different neighbor nodes being ignored. This behavior eliminates the chance of discovering multiple paths to the same producer node. The single-path behavior is intended to save bandwidth and reduce unnecessary data packet transmission in the network. This may work well in wired networks by assuming all paths are stable and experience similar packet data loss. However, it is not the case in a wireless mesh network where link status can be highly unreliable and unpredictable.

FIG. 5 illustrates modifications to a traditional ICN pipeline for handling interest packets to implement the present technique. The elements 545 and 580 represent the changes to the standard ICN technique to enable multi-path discovery through discovery interest and discovery data packets, and metric information that is accumulated (e.g., updated) as discovery packets (e.g., discovery interest or discovery data packets) as they traverse different paths. The final accumulated path strength metric may be used by the consumer node to facilitate selection of a producer node (e.g., compute node or data node).

As illustrated in FIG. 5, in the incoming interest pipeline 505, an interest packet is received (operation 510). If the interest packet violates a criterion (e.g., trust) of the localhost, the packet is dropped (decision 515). Otherwise, if the packet is a duplicate based on a list of known duplicates (decision 520), the packet is sent to the interest loop (operation 550). Otherwise, the packet is tested to determine whether a forwarding hint indicates that the receiving node is in the receiving region (decision 525). If yes, the hint is stripped (operation 530). The packet is then inserted into the PIT (operation 535). The PIT entry is used to ascertain whether there is another PIT entry indicating a duplicate (decision 540). If yes, the packet is tested to determine whether the interface into which the packet received is the same as the PIT entry (decision 545). If yes, the packet is sent to the interest loop (operation 740). Otherwise, an expiration timer is reset (operation 550). Decision 545 supports multiple-path detection because only interest packets with same nonce (e.g., random number to provide differentiation when packet names match) will be regarded as a loop if they are coming from the same interface. Here, each intermediate node and producer node records the interface identification (face id) if the interest packets with the same nonce comes from different faces.

When the packet is a duplicate with a different interface (decision 545), or not a duplicate (decision 540), the expiration timer is canceled (operation 560). The packet is then tested to determine whether is pending (decision 565) if yes, then a content store miss is indicated (operation 555). Otherwise, a lookup in the content store is made (decision 570) and, if the lookup fails, the content store miss is also indicated (operation 555). Otherwise, the processing moves over to the content store hit pipeline 575 of a producer node (e.g., a node responding to the interest packet with a data packet).

Here, a multi-data packet timer is checked (decision 580). If the timer has not expired, then the CS hit operations are performed (operation 585). Otherwise, a PIT entry expiration timer is set for the interest packet (operation 590). Upon expiration of this timer, the packet's nonce is inserted into the dead nonce list (operation 595) and the corresponding PIT entry is removed. These operations support multiple-data packets being returned from a producer node, enabling, multi-path discovery. The producer node may keep the PIT entry until the multi-data timer expires. As illustrated, the timer is started when the first data packet is sent. before this timer expires, enabling the producer node to resend the data packet back toward the consumer node when an interest packet with the same nonce is received from a different interface.

Figure 6:
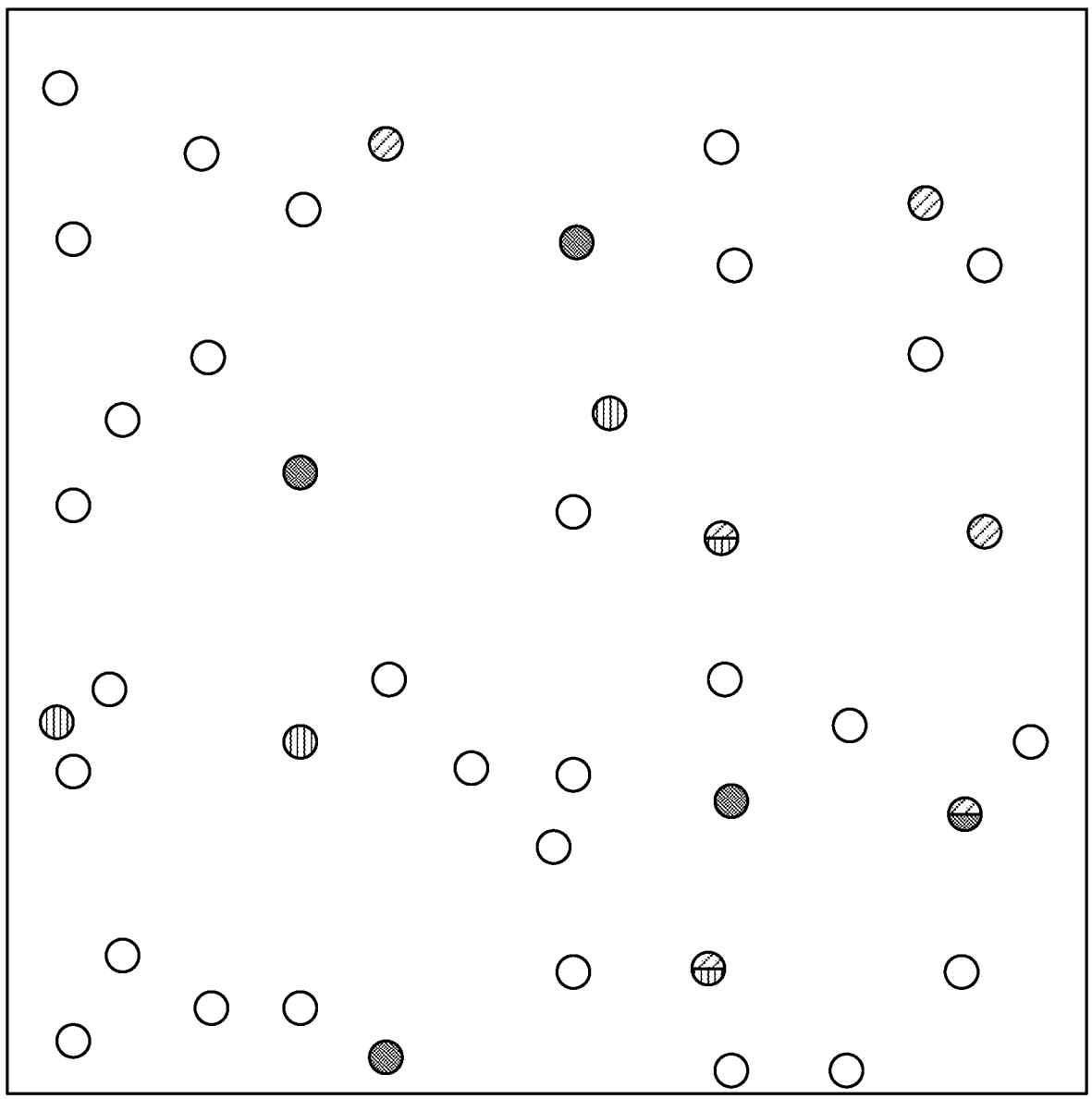
FIG. 6 illustrates an example mapping of node capabilities.

FIG. 6 illustrates node capabilities. Different edge nodes have different capabilities, with some having compute capability (e.g., hardware or HW) only, some may have functions (e.g., software or SW) only and some may have raw data (e.g., sensors or cameras) that needs to be processed before use. Some nodes have more than one capability, e.g., a node may have both compute capability and required functions (HW+SW) but no data, or a node has all the capabilities (HW+SW+Raw Data).

The network may also include a "normal node" that doesn't have any applicable capability (e.g., it doesn't have HW, SW or raw data). For example, vehicles, which may not have HW, SW or raw data resources for others to use may consume processed data, such as observations about surrounding area from extracting and fusing outputs of different sensors.

In existing edge computing architectures, typically, the clients subscribe to an application and the application may have instances on an edge server. When the request comes in from the client, the request may be routed to the edge server using a local breakout. If the application is not already installed on a known edge server, the request may be routed to the cloud.

Today's compute orchestration frameworks, like Kubernetes, provide automated management of the compute components of a large system for high availability and persistence. These frameworks may push containers out to different machines, making sure that the containers run. The frameworks may also enable users to instantiate (e.g., spin up) a few more containers with a specific application when demand increases. These frameworks provide a platform that enables large numbers of containers to work together in harmony and reduces operational burden.

ICN research has highlighted the suitability of ICN frameworks for distributed real-time edge computing applications. On the compute front, function as a service (FaaS) that enables distributed implementation of compute is emerging. ICN-based compute orchestration shows a bright future on the distributed and dynamic architecture, dynamic discovery, and data fetching.

Although the frameworks mentioned above may provide orchestration, they still have limitations. For example, in existing edge computing solutions, if an application is not already installed at the edge, the request is generally to be routed to the cloud. Latency may be high and network congestion may manifest if many requests are routed to the cloud. If the clients request a wide range of applications or if popular applications change rapidly at the edge, today's orchestration will not be able to keep up with the workload and many requests may be sent to the cloud. Furthermore, if the full application does not exist, there is generally no mechanism to compose the application on the fly.

Today's compute orchestration frameworks are largely centralized and out of band, used to schedule computation or collect telemetry data. They have limited ability to support dynamically changing service requests at the edge and typically do not have the ability to recruit edge devices dynamically into the computation pool, such as a processor on a mobile device with changing connectivity that may offer computing services.

Today's orchestrators like Kubernetes (K8s) lack the concept of timeliness (e.g., real time) or network resource constraints (e.g., available bandwidth and connectivity). This which further limits their effectiveness to support wireless edge networks. Frameworks that may handle dynamic computation and orchestration in mobile edge networks—where both the computational requirements as well as computation nodes are changing dynamically—are not well-developed.

ICN-based orchestration also presents many challenges before its full potential may be realized. For example, current ICN designs often focuses on data only fetching, supporting only one data packet feedback—such that only the first received data packet at an ICN node is sent back to the consumer; subsequent data packets from different nodes being deleted. This is not suitable for content discovery.

To address these issues, an efficient edge node—nodes with different capabilities—orchestration is described to accommodate service requests in a real-time and distributed fashion in the highly dynamic environment. Here, the network and the client work together accomplish a task (e.g., sub-unit of an orchestrated application) at an edge node. The discussion herein provides techniques to compose complex applications on the fly by breaking them down into smaller functions. The described orchestration framework covers different examples that efficiently orchestrate edge nodes with different capabilities to accomplish the work tasks real-timely based on the knowledges of the network.

Nodes may be smart phone, base stations, vehicles, RSUs, sensors, cameras, or other network connected devices. The nodes may be static or moving from time to time, such as a vehicle or a mobile phone. Wireless networks with or without infrastructure support may be used. Nodes may communicate with wireless technologies—such as DSRC, cellular—or wired technologies—such as fiber optics, copper, etc. Thus, for some use cases, the nodes are connected via wired connections, such as base stations connecting via wired (e.g., Ethernet) network. Content refers to a compute resource (HW), function (SW), or data. Three procedures for content discovery and edge offloading decision making are described below.

The first procedure involves a client performing discovery of all the required content and making orchestration decisions. Here, it is assumed that the client doesn't have HW, SW or Data (e.g., is a normal node). The client discovers all of the necessary contents—such as compute resources, functions, and data—and gains the knowledge of where the contents are. At this point, the contents are still in the remote nodes; the client only knowing the location of the contents and how to fetch them. The client may then select one or more nodes with HW to perform the computation task and decides how to fetch the functions and data. There are two alternatives to fetch the functions and data.

Figure 7:
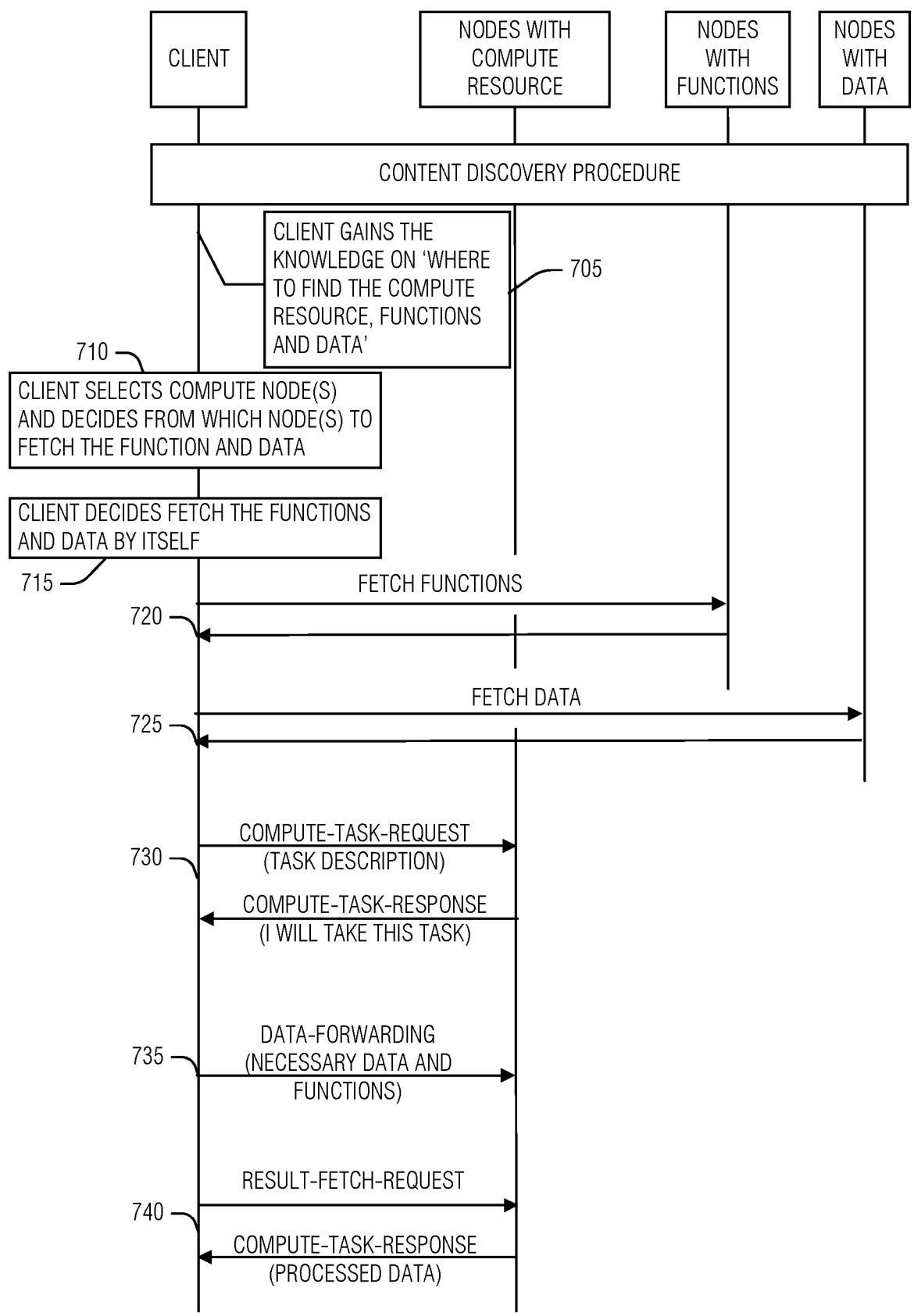
FIG. 7 illustrates a swim lane of task orchestration.

FIG. 7 illustrates a swim lane of task orchestration according to an embodiment. This is the first alternative. As illustrated, the client starts by acquiring the location of contents (operation 705) and selects which nodes to use (operation 710). The client determines to fetch the functions and data (operation 715).

The client then fetches the necessary functions (exchange 720) and data (exchange 725) and forwards the functions and data along with the Compute-Task-Request to the selected node(s) that have the requisite compute resources (exchange 735). Before sending Compute-Task-Request, the client may negotiate with the selected compute node and waits for the acknowledgement from it (exchange 730).

If ICN is used, after the client makes the edge offloading decision, it will send interest packets to fetch the functions and data separately. After it gets the data packets which carrying the requested functions and data, it sends an interest packet which carries the Compute-Task-Negotiate to the compute node. The compute node feedbacks a data packet which carries the Compute-Task-Negotiate-Feedback. And then Client sends another interest packet to carry Compute-Task-Request and waiting for the data packet which carries Compute-Task-Response from the compute node (exchange 740).

Figure 8:
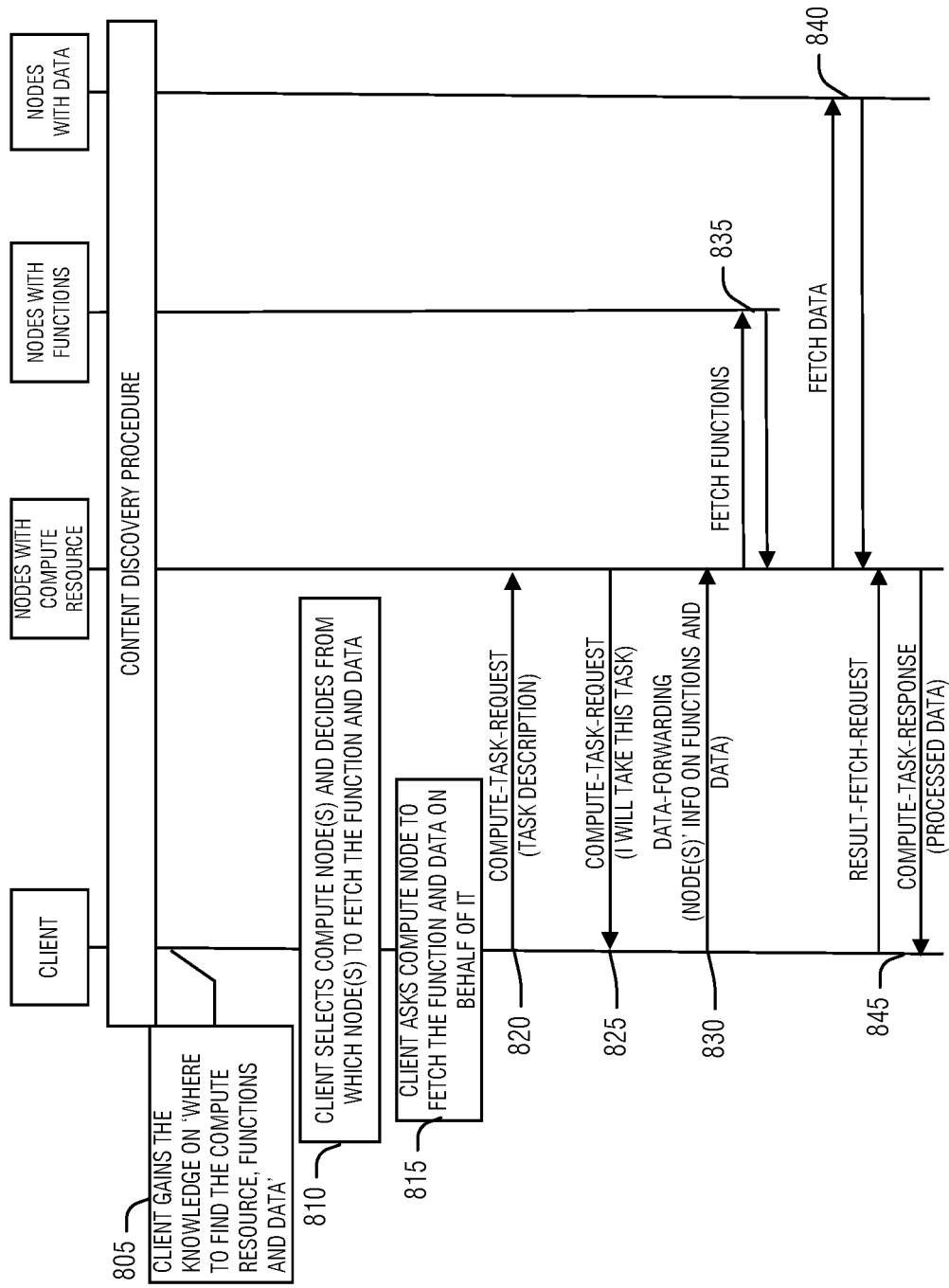
FIG. 8 illustrates a swim lane of task orchestration.

FIG. 8 illustrates a swim lane of task orchestration according to an embodiment. This is the second alternative. Again, the client starts by acquiring the location of contents (operation 805) and selects which nodes to use (operation 810). Now, however, the client signals to the compute node where to find the function or data (operation 815). The client will provide this information using modifications to the interest packet described herein. In the illustrated example, the client confirms that the compute node will handle the request (exchange 820), receives confirmation (exchange 825), and informs the compute node how to fetch the data (exchange 830). In an example, the client tells the selected nodes how to fetch the functions and data in the Compute-Task-Request (exchange 820). After the node(s) that has compute resource receives the request, it initiates the procedures to fetch the functions (exchange 835) and data (exchange 840).

In the Compute-Task-Request, which may be an interest packet, the client includes the information assist the compute node in finding the corresponding function or data. In an example, the information is included in the Application-Parameters field of the interest packet. Here, after the compute node receives the Compute-Task-Request packet, the compute node uses the information carried in ApplicationParameters field to fetch the function (exchange 835) or the data (exchange 840). The ApplicationParameters field may include the name of the producer that has the information, the ApplicationParameters field may include the full name of the function (e.g., including version number), or the ApplicationParameters field may include a node ID that has the information.

The compute node may use a ForwardingHint to assist the intermediate routers to forward the interest packet—to fetch the functions or data—to the correct network region or put the function node or Data node's ID in the name of interest packet to facilitate routing. Here, a ForwardingHint may be embedded in an interest packet to assist forwarding. This is especially useful if the intermediate nodes don't have the full information about where to find the content in their FIBs.

Figure 9:
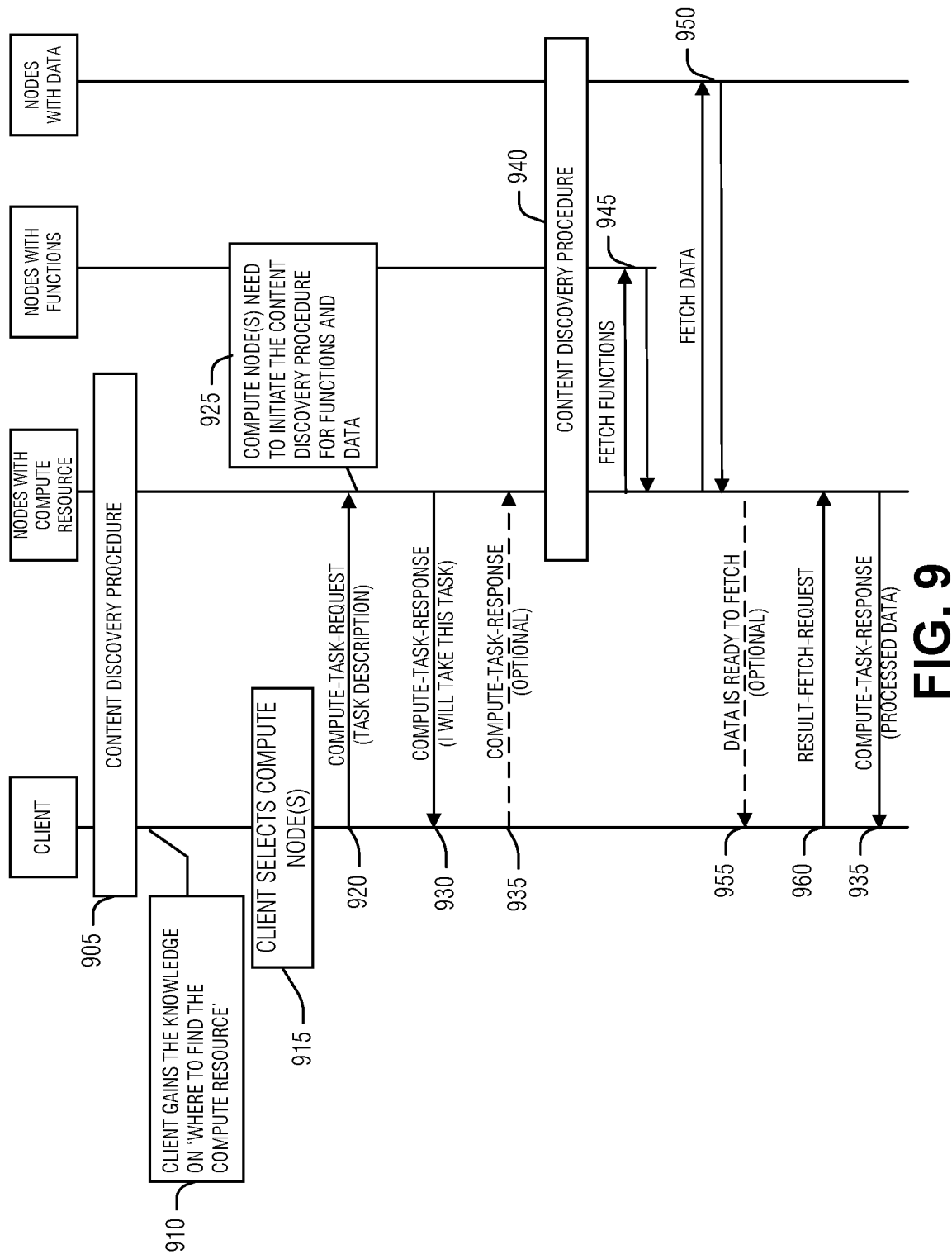
FIG. 9 illustrates a swim lane of task orchestration.

FIG. 9 illustrates a swim lane of task orchestration according to an embodiment. Here, the client performs compute node discovery only. Thus, it is assumed that the client doesn't have HW, SW or Data but the client discovers compute resources only. After the discovery phase (operation 905) finishes, the client gains the knowledge of the nodes with compute resource (operation 910). The client then selects one or more compute nodes to perform the computation task (operation 915) and sends the Compute-Task-Request (exchange 920). Along with the Compute-Task-Request, the requirements on the functions and data are also carried (operation 925). Once the compute node agrees to the task (exchange 930). The compute node(s) discover the functions and data on behalf of the client (operation 940). This may be facilitated by a Compute-Task-Response (exchange 935) indicating that the compute node should proceed. The compute node, following the discovery (operation 940) then fetches the functions (exchange 945) or data (950) and provides the results to the client (exchange 935) in response to a client request for the results (exchange 960). In an example, the compute node may notify the client when the results are complete (exchange 955).

In an example, the client publishes the Compute-Task-Request and waits for the results. Here, client publishes the request—which carries the requirements on computing resource, functions, or data—to all compute nodes. Any node that receives this request may choose to take responsibility (or partial responsibility) based on its capabilities to complete the request. This technique is dynamic and enables the network to provide the orchestration effectively.

Figure 10:
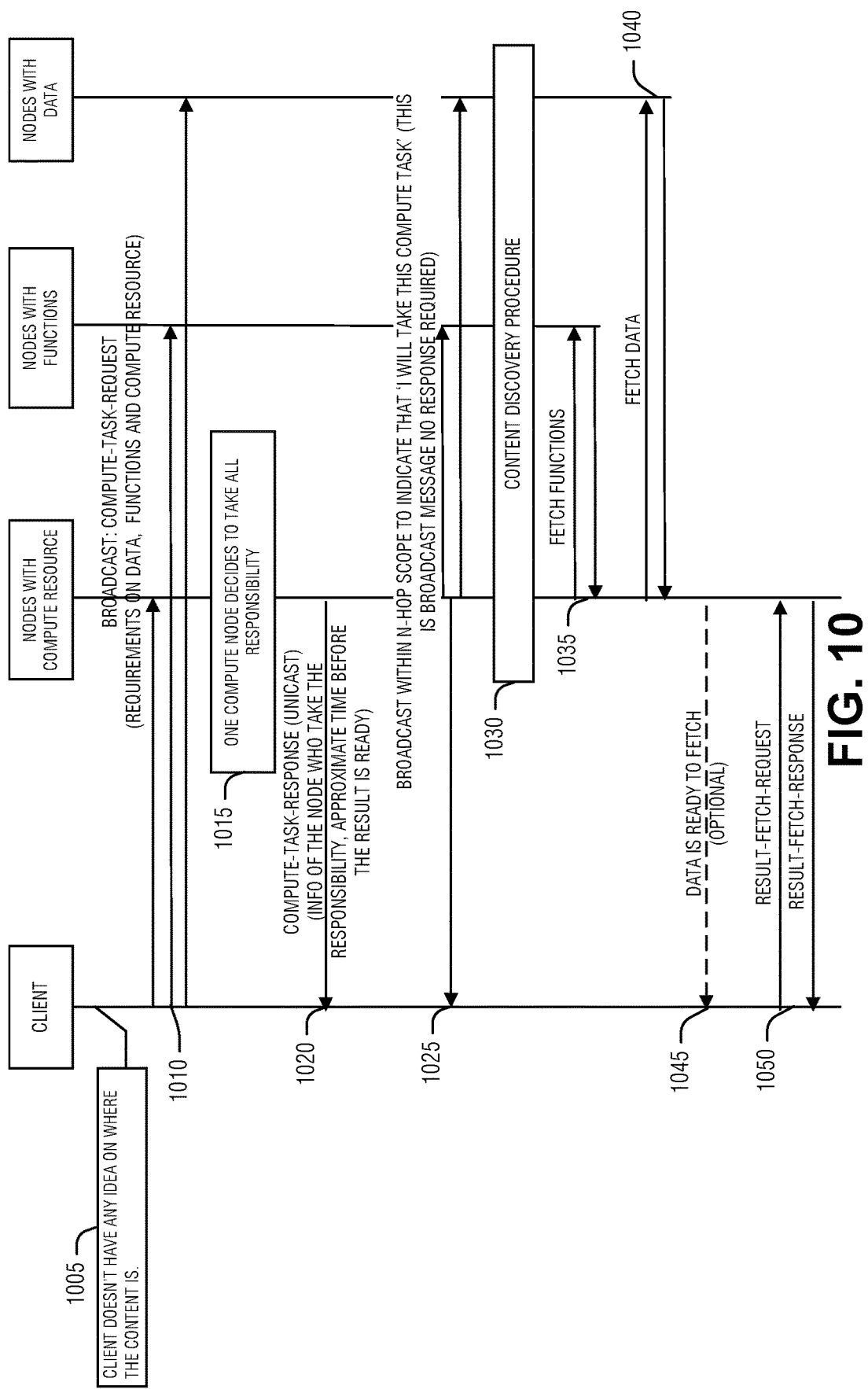
FIG. 10 illustrates a swim lane of task orchestration.

FIG. 10 illustrates a swim lane of task orchestration according to an embodiment. Here, a node may take complete responsibility for the requested service task and act as a leader to accomplish the task. Here the client determines that it can't locate contents (operation 1005) and broadcasts a request to compute a task (exchange 1010). When a node with enough computing resource receives this request, it may take all of the responsibilities (operation 1015) to discover (operation 1030 and exchanges 1020 and 1025) and fetching the functions (exchange 1035) or data(exchange 1040) if it is not available on the compute node. The compute node may also finish the computing task after functions and data are fetched; 4) returning the results to the client (exchange 1050), perhaps after alerting the client that the results are complete (exchange 1045).

In this technique, the network completely decides on how to get the compute task done. This is unique in that, when one compute node decides to take the task, it will not only send a unicast Compute-Task-Response (which is a data packet in exchange 1020) to the client to indicate that it will take the task, but also broadcasts "I will take the task" to neighbors (exchange 1025) to avoid multiple compute nodes working on the same task. This broadcast message (exchange 1025) may be either a specific interest packet that doesn't elicit a data packet; or a push-based data packet. The compute node may set how many hops the broadcast message (exchange 1025) will be forwarded. Here, each intermediate node receiving this broadcast message will keep broadcasting it through all available faces except the one receiving it.

In an example, if a specific Interest packet is used, two alternatives may be considered to indicate that this is an interest without data packet response. First, a specific name—such as/InfoSharing/—may be defined to tell the receiving node that this is just an information sharing interest and the corresponding shared info (e.g., description of the task, which is already taken) may be found in the ApplicationParameters field. Second, a new field may be carried in the interest packet including both task description. The following table illustrates this alternative:

| Name | HopLimit | ... | New field for 'task description' and indicating no feedback needed | ApplicationParameter |
|------|----------|-----|-------------------------------------------------------------------|----------------------|

If a push-based data packet is used, MetaInfo (e.g., a field) may defined to indicate that this data packet is a push-based broadcast message. Here, the task description may be carried in the content part of the data packet.

The "description of the task" may include the original task requirement received from the client, client information if available—which may be used to differentiate the clients because it is possible that there are several clients initiating the same task which asks for the same function and same data, or a valid timer for taking this task. For example, after one node receives a broadcast "I will take the task" message, it will ignore any 'Compute-Task-Request' message which is received before the timer expires.

In addition to broadcasting the info "I will take the task", the compute node may also broadcast "I already have the computation results" in case a similar Compute-Task-Request coming from another client later and the compute node stores the result. This enables data reuse to save the compute resource and reduce the overhead of the network.

Figure 11:
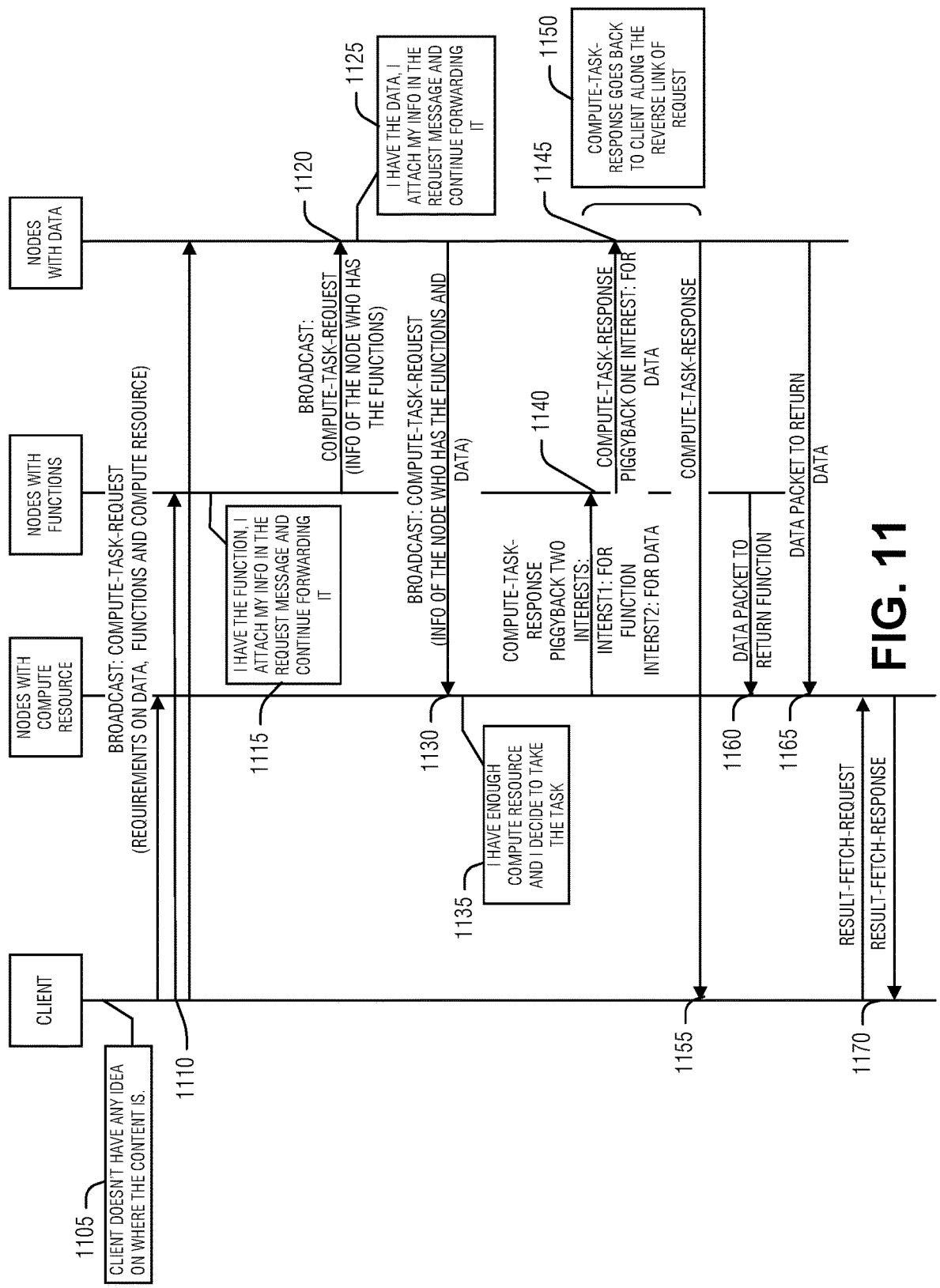
FIG. 11 illustrates a swim lane of task orchestration.

FIG. 11 illustrates a swim lane of task orchestration according to an embodiment. In this example, a node may take partial responsibility for the task and cooperate with other nodes to collectively accomplish the service request published by the client. Again, the client cannot discover the contents (operation 1105) and broadcasts the request (exchange 1110). For example, when a node with functions receives this request (operation 1115), it attaches its node information (e.g., ID, location, moving speed, and etc.) to the original request and forwards it to other nodes (exchange 1120). The nodes with data perform the same operation (operation 1125 and exchange 1130). Eventually, a node with enough compute resource to finish the task receives the extended request with the information about the availability of functions and data (operation 1135). Once this node decides to take the compute task, it can retrieve functions and data quickly and saves the time on the discovery.

Every intermediate node is able to attach its info into the Compute-Task-Request and then forwards it out, no matter it is the node with HW, SW or Data. When a node receives this request message and find all of the info attached in this message can meet the task's requirement, it will make a decision. For example, when a node with function receives this message and finds that the info of nodes with compute and Data are already attached in this message, it will stop broadcasting, attaches its info in the request message, select the compute node, and sends the request back to the selected compute node.

The Compute-Task-Response (which may be a data packet) is sent back to the client along the exact return path to client (exchange 1155). Compute node piggyback two interest packets (exchanges 1140 and 1145) which are used to fetch functions (exchange 1160) and data (exchange 1165) in the Compute-Task-Response. Each node on the reverse link creates PIT entries for the piggybacked interest packets. When the Compute-Task-Response goes through the data node and function node, the required function and data will be sent to compute node in separate data packet. the computation is complete, the result is delivered to the client (exchange 1170).

Figure 12:
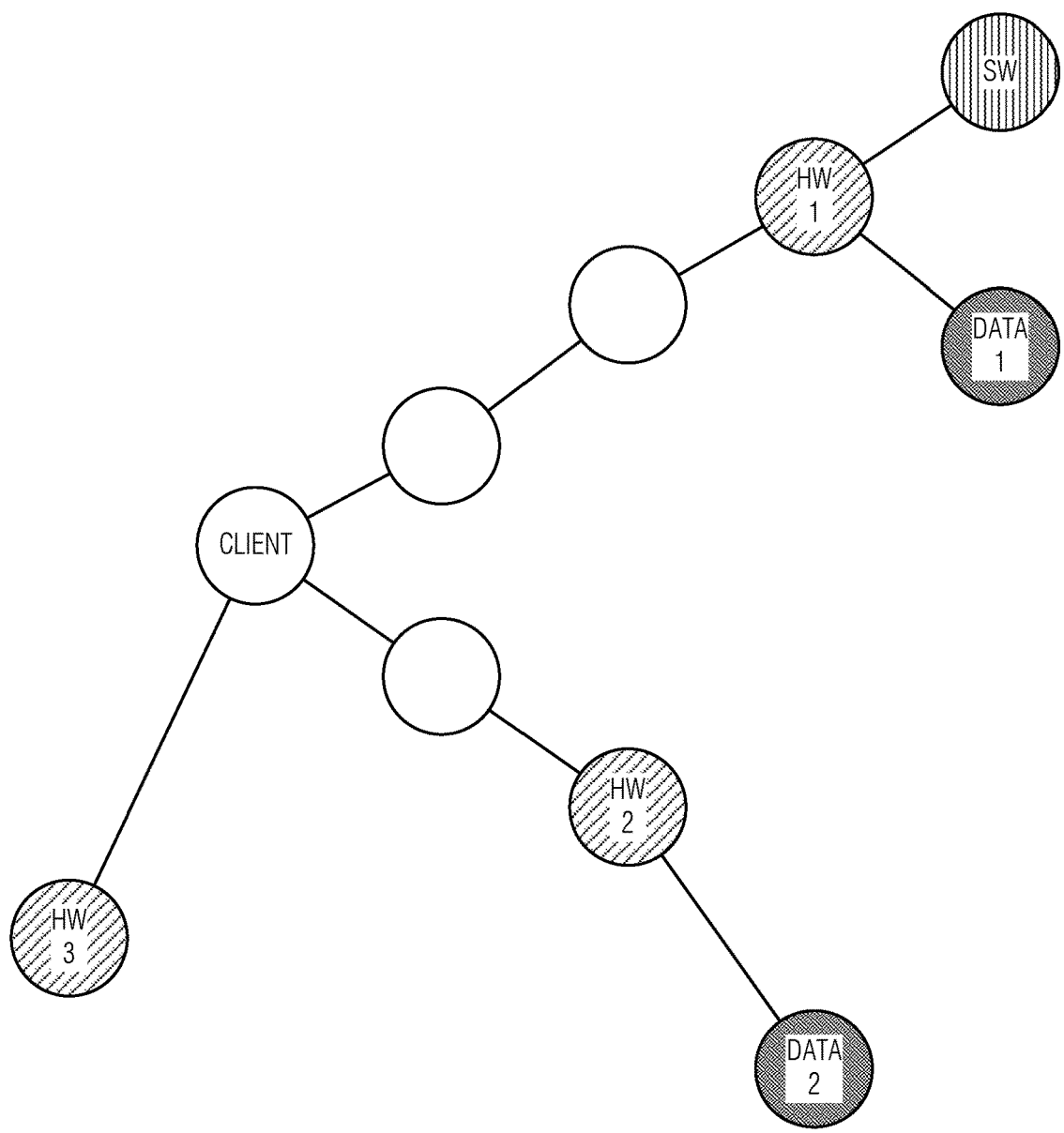
FIG. 12 illustrates an example of compute node selection.

FIG. 12 illustrates an example of compute node selection. Examples of the information carried in various ICN packets to implement the above are provided tables 1-4. These tables just list the information elements to be carried in the messages, however, other fields may be used, for example, given different network technologies (e.g., Internet Protocol (IP)) that may have different data formats.

TABLE 1

Compute-Task-Request

| Information element | Presence | Description |
|---|---|---|
| Task Description | M | Description of the task |
| > Data Name | | Required data name |
| > Data Availability | | '1' - data is available on the client; '0' - data is unavailable on the client; |
| > Data Size | | If data is unavailable on the client, it is the estimation on the data size |
| > Function Name | | Required function name |
| > Function Availability | | '1' - function is available on the client; '0' - function is unavailable on the client; |
| > Time | | Time when client sends out the message. Time is compound value consisting of finite-length sequences of integers (not characters) of the form, e.g., "HH, MM, SS" |
| > Valid period | | It indicates the valid time duration of this Request message. It is a relative time duration, and each forwarder has to check if the Request message is still valid or not. |
| Client Info | M | Description of the client |
| > ID | | Layer-2 ID of the node who sends the Response |
| > Location | | Location information which includes Latitude and Longitude |
| > Moving Speed | | Client's moving speed |

TABLE 2

Compute-Task-Response

| Information element | Presence | Description |
|---|---|---|
| Feedback | M | '1' - will take the task; '0' - won't take the task; |
| Node Info | O | Info of the node who sends this Response message. Shall be present if 'Feedback' is set to '1' |
| > ID | | Layer-2 ID of the node who sends the Response |
| > Location | | Location information which includes Latitude and Longitude |
| > Moving Speed | | Node's moving speed |
| Data Availability | M | '1'- Send Data to me '0'- I already have the data |

TABLE 2-continued

Compute-Task-Response

| Information element | Presence | Description |
| --- | --- | --- |
| Function Availability | M | '1'- Send Function to me<br>'0'- I already have the function |
| Result Name | O | The name for the result if 'Feedback' is set to '1' |
| Time for the task | O | Approximate time to finish this task if 'Feedback' is set to '1' |

TABLE 3

Result-Fetch-Request

| Information element | Presence | Description |
| --- | --- | --- |
| Client Info | M | |
| > ID | | Layer-2 ID of the node who sends the Request |
| > Location | | Location information which includes Latitude and Longitude |
| > Moving Speed | | Client's moving speed |
| Destination Node Info | M | |
| > ID | | Layer-2 ID of the destination node |
| > Location | | Location information which includes Latitude and Longitude |
| Result Name | M | The name for the result |

TABLE 4

Result-Fetch-Response

| Information element | Presence | Description |
| --- | --- | --- |
| Result Name | M | Result name |
| Result | M | Results |
| Client Info | M | The info of the node which will receive the results |
| > ID | | Layer-2 ID of the destination node |
| > Location | | Location information which includes Latitude and Longitude |

A complete orchestration procedure may provide a sequence of task offloading procedures. Here a "task" may be fetching data, fetching a function, or taking computation responsibility. A node with limited resources offloads one or multiple tasks to one or multiple nodes with task-tackling capabilities by sending out the negotiation messages. The node offloading a task may be called "mapper." For example, the client offloading a compute task above, the node with computation resources offloading a function-fetching task above, may both be mappers. The node with task-tackling capabilities may be called a "worker," such as the node with computation resources to implement a computation task or the node storing a needed function as described above.

A task-offloading procedure lasts from the time when the mapper sends a negotiation message to a worker that may potentially tackle the task until the time that the mapper receives the feedbacks (e.g., data packets), such as the task-tackling result or a rejection message. For example, the procedure of tackling a computation task is judged from the time when the client (mapper) sends the Compute-task-negotiation to a node (worker) with computation resource until the time that the client receives the computation results from that node.

Dynamic network environments bring uncertainties to the orchestration system. While a mapper may have discovered multiple nodes with available resources to tackle the entire or part of the task after the content discovery procedure. Here, the mapper dynamically makes decisions on choosing the best worker among the discovered workers to offload the task, and the goal is to minimize the average delay of sequences of task offloading procedures.

A dynamic orchestration policy operates by balancing the exploration and exploitation tradeoff among the candidate workers. For each discovered worker, the mapper recursively computes a utility function, whose value represents an estimated potential ability of task-tackling. This utility function of each worker consists of two tradeoff factors. First, the experienced average delay of tackling previous tasks. Second, the potential delay decreases if committing to tackle the current task. At each time of making an offloading decision, the worker with the minimum utility value wins the task-tackling responsibility in the current round. This policy dynamically explores different workers to learn each of their performance potentials, while at the same time selects the empirically best worker as many as possible.

Figure 13:
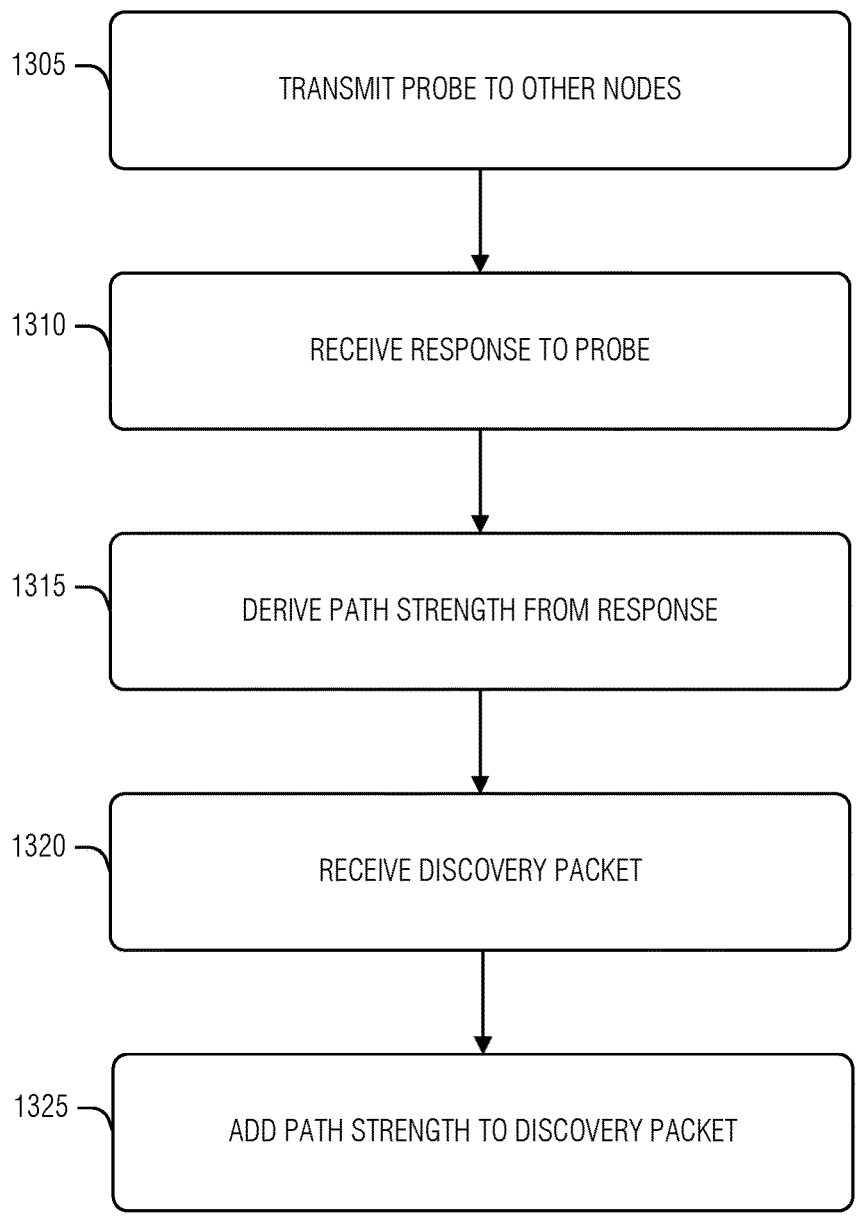
FIG. 13 illustrates a flow diagram of an example of a method for capability discovery in an information centric network.

FIG. 13 illustrates a flow diagram of an example of a method 1300 for capability discovery in an information centric network, according to an embodiment. The operations of the method 1300 are performed by computer hardware, such as that described above or below (e.g., processing circuitry).

At operation 1305, a probe message is transmitted by an ICN node to other ICN nodes.

At operation 1310, the ICN node receives a response to the probe message.

At operation 1315, a path strength metric is derived from the response. In an example, deriving the path strength metric includes calculating a transmission success probability metric based on the response. In an example, the transmission success probability metric corresponds to a backward link from the neighbor ICN node to the ICN node. In an example, calculating the transmission success probability metric includes averaging successful transmission counts across multiple probe messages to a neighbor ICN node. In an example, the averaging is taken over a moving window time period. In an example, In an example, deriving the path strength metric includes calculating an expected maximum transmission rate metric based on the response. In an example, calculating the expected maximum transmission rate metric includes averaging channel realizations across multiple probe messages to a neighbor ICN node. In an example, the expected maximum transmission rate metric corresponds to a backward link from the neighbor ICN node to the ICN node.

In an example, the average of the channel realizations across the multiple probe messages is taken is over a moving window time period. In an example, the expected maximum transmission rate metric $\overline{C}_{ij}$ is calculated by:

$$\overline{C}_{ij}(t) = \frac{1}{m_{ji}(t)} \sum_{k=1}^{m_{ji}(t)} \log(1 + SNR_{ji}(k))$$

where $m_{ji}(t)$ are a number of responses received from neighbor ICN node j corresponding to a probe message from the ICN node i in time period t.

In an example, deriving the path strength metric includes calculating a transmission success probability metric based on the response, calculating an expected maximum transmission rate metric based on the response, and combining the transmission success probability metric and the expected maximum transmission rate to create the path strength metric. In an example, combining the transmission success probability metric and the expected maximum transmission rate metric includes using a Simple Additive weighting (SAW).

At operation 1320, a discovery packet is received. In an example, the discovery packet is an interest packet.

At operation 1325, the path strength metric is added to the discovery packet. In an example, when the discovery packet is an interest packet, the path strength metric is added prior to forwarding the interest packet. In an example, adding the path strength metric to the discovery packet includes extracting a path strength value from the discovery packet, adding the path strength metric to the path strength value to create a modified path strength value, and replacing the path strength value in the discovery packet with the modified path strength value.

Figure 14:
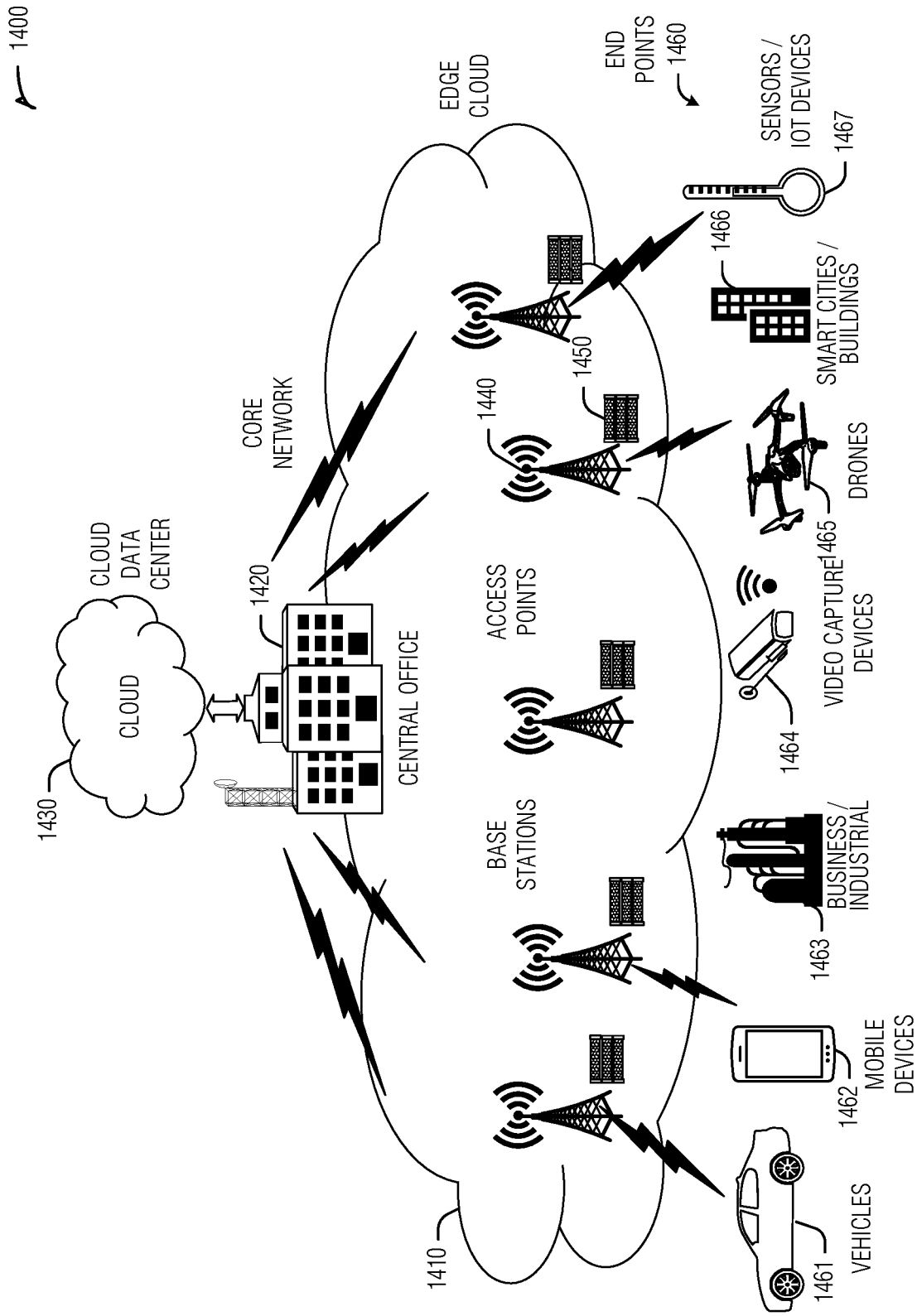
FIG. 14 illustrates an overview of an Edge cloud configuration for Edge computing.

FIG. 14 is a block diagram 1400 showing an overview of a configuration for Edge computing, which includes a layer of processing referred to in many of the following examples as an "Edge cloud". As shown, the Edge cloud 1410 is co-located at an Edge location, such as an access point or base station 1440, a local processing hub 1450, or a central office 1420, and thus may include multiple entities, devices, and equipment instances. The Edge cloud 1410 is located much closer to the endpoint (consumer and producer) data sources 1460 (e.g., autonomous vehicles 1461, user equipment 1462, business and industrial equipment 1463, video capture devices 1464, drones 1465, smart cities and building devices 1466, sensors and IoT devices 1467, etc.) than the cloud data center 1430. Compute, memory, and storage resources which are offered at the edges in the Edge cloud 1410 are critical to providing ultra-low latency response times for services and functions used by the endpoint data sources 1460 as well as reduce network backhaul traffic from the Edge cloud 1410 toward cloud data center 1430 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or, bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 15:
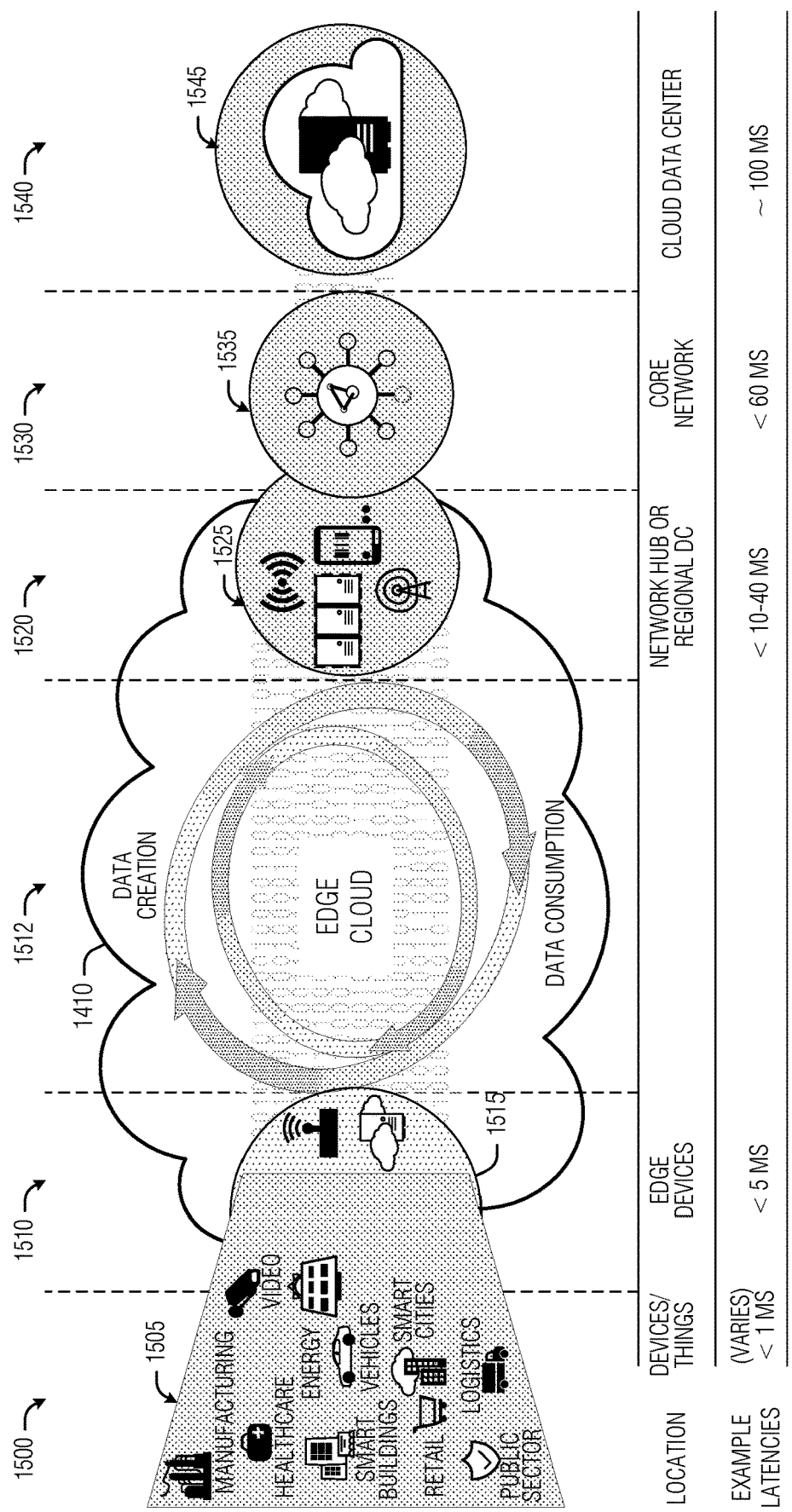
FIG. 15 illustrates operational layers among endpoints, an Edge cloud, and cloud computing environments.

FIG. 15 illustrates operational layers among endpoints, an Edge cloud, and cloud computing environments. Specifically, FIG. 15 depicts examples of computational use cases 1505, utilizing the Edge cloud 1410 among multiple illustrative layers of network computing. The layers begin at an endpoint (devices and things) layer 1500, which accesses the Edge cloud 1410 to conduct data creation, analysis, and data consumption activities. The Edge cloud 1410 may span multiple network layers, such as an Edge devices layer 1510 having gateways, on-premise servers, or network equipment (nodes 1515) located in physically proximate Edge systems; a network access layer 1520, encompassing base stations, radio processing units, network hubs, regional data centers (DC), or local network equipment (equipment 1525); and any equipment, devices, or nodes located therebetween (in layer 1512, not illustrated in detail). The network communications within the Edge cloud 1410 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1500, under 5 ms at the Edge devices layer 1510, to even between 10 to 40 ms when communicating with nodes at the network access layer 1520. Beyond the Edge cloud 1410 are core network 1530 and cloud data center 1540 layers, each with increasing latency (e.g., between 50-60 ms at the core network layer 1530, to 100 or more ms at the cloud data center layer). As a result, operations at a core network data center 1535 or a cloud data center 1545, with latencies of at least 50 to 100 ms or more, will not be able to accomplish many time-critical functions of the use cases 1505. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 1535 or a cloud data center 1545, a central office or content data network may be considered as being located within a "near Edge" layer ("near" to the cloud, having high latency values when communicating with the devices and endpoints of the use cases 1505), whereas an access point, base station, on-premise server, or network gateway may be considered as located within a "far Edge" layer ("far" from the cloud, having low latency values when communicating with the devices and endpoints of the use cases 1505). It will be understood that other categorizations of a particular network layer as constituting a "close", "local", "near", "middle", or "far" Edge may be based on latency, distance, number of network hops, or other measurable characteristics, as measured from a source in any of the network layers 1500-1540.

The various use cases 1505 may access resources under usage pressure from incoming streams, due to multiple services utilizing the Edge cloud. To achieve results with low latency, the services executed within the Edge cloud 1410 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 1410 may provide the ability to serve and respond to multiple applications of the use cases 1505 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 1410 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 1410 (network layers 1500-1540), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 1410.

As such, the Edge cloud 1410 is formed from network components and functional features operated by and within Edge gateway nodes, Edge aggregation nodes, or other Edge compute nodes among network layers 1510-1530. The Edge cloud 1410 thus may be embodied as any type of network that provides Edge computing or storage resources which are proximately located to radio access network (RAN) capable endpoint devices (e.g., mobile computing devices, IoT devices, smart devices, etc.), which are discussed herein. In other words, the Edge cloud 1410 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage or compute capabilities. Other types and forms of network access (e.g., Wi-Fi, long-range wireless, wired networks including optical networks, etc.) may also be utilized in place of or in combination with such 3GPP carrier networks.

The network components of the Edge cloud 1410 may be servers, multi-tenant servers, appliance computing devices, or any other type of computing devices. For example, the Edge cloud 1410 may include an appliance computing device that is a self-contained electronic device including a housing, a chassis, a case, or a shell. In some circumstances, the housing may be dimensioned for portability such that it can be carried by a human or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), or enable submergibility. Example housings may include power circuitry to provide power for stationary or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, or wireless power inputs. Example housings or surfaces thereof may include or connect to mounting hardware to enable attachment to structures such as buildings, telecommunication structures (e.g., poles, antenna structures, etc.), or racks (e.g., server racks, blade mounts, etc.). Example housings or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface or mounted to the surface of the appliance. Example housings or surfaces thereof may support mechanical connectivity, such as propulsion hardware (e.g., wheels, rotors such as propellers, etc.) or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein or attached thereto. Output devices may include displays, touchscreens, lights, light-emitting diodes (LEDs), speakers, input/output (I/O) ports (e.g., universal serial bus (USB)), etc. In some circumstances, Edge devices are devices presented in the network for a specific purpose (e.g., a traffic light), but may have processing or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The Edge cloud 1410 may also include one or more servers or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications or other software, code, or scripts may execute while being isolated from one or more other applications, software, code, or scripts.

Figure 16:
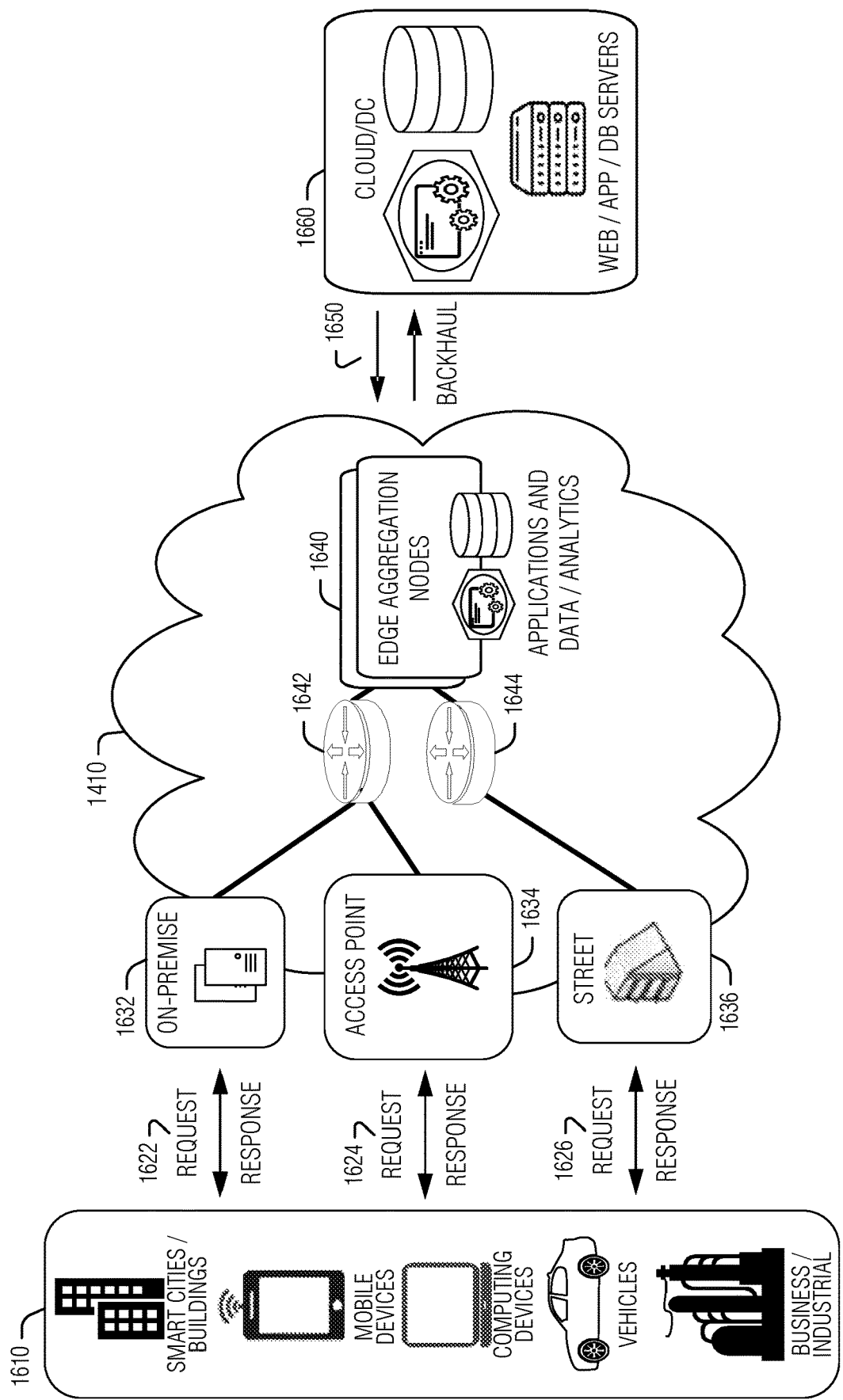
FIG. 16 illustrates an example approach for networking and services in an Edge computing system.

In FIG. 16, various client endpoints 1610 (in the form of mobile devices, computers, autonomous vehicles, business computing equipment, industrial processing equipment) exchange requests and responses that are specific to the type of endpoint network aggregation. For instance, client endpoints 1610 may obtain network access via a wired broadband network, by exchanging requests and responses 1622 through an on-premise network system 1632. Some client endpoints 1610, such as mobile computing devices, may obtain network access via a wireless broadband network, by exchanging requests and responses 1624 through an access point (e.g., a cellular network tower) 1634. Some client endpoints 1610, such as autonomous vehicles may obtain network access for requests and responses 1626 via a wireless vehicular network through a street-located network system 1636. However, regardless of the type of network access, the TSP may deploy aggregation points 1642, 1644 within the Edge cloud 1410 to aggregate traffic and requests. Thus, within the Edge cloud 1410, the TSP may deploy various compute and storage resources, such as at Edge aggregation nodes 1640, to provide requested content. The Edge aggregation nodes 1640 and other systems of the Edge cloud 1410 are connected to a cloud or data center 1660, which uses a backhaul network 1650 to fulfill higher-latency requests from a cloud/data center for websites, applications, database servers, etc. Additional or consolidated instances of the Edge aggregation nodes 1640 and the aggregation points 1642, 1644, including those deployed on a single server framework, may also be present within the Edge cloud 1410 or other areas of the TSP infrastructure.

In further examples, respective Edge compute nodes may be embodied as a type of device, appliance, computer, or other "thing" capable of communicating with other Edge, networking, or endpoint components. For example, an Edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D XPoint™ memory), or other byte addressable write-in-place nonvolatile memory devices. The memory device may refer to the die itself or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of memory may store various software and data used during operation such as one or more applications, data operated on by the application(s), libraries, and drivers.

In some examples, resistor-based or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

Figure 17:
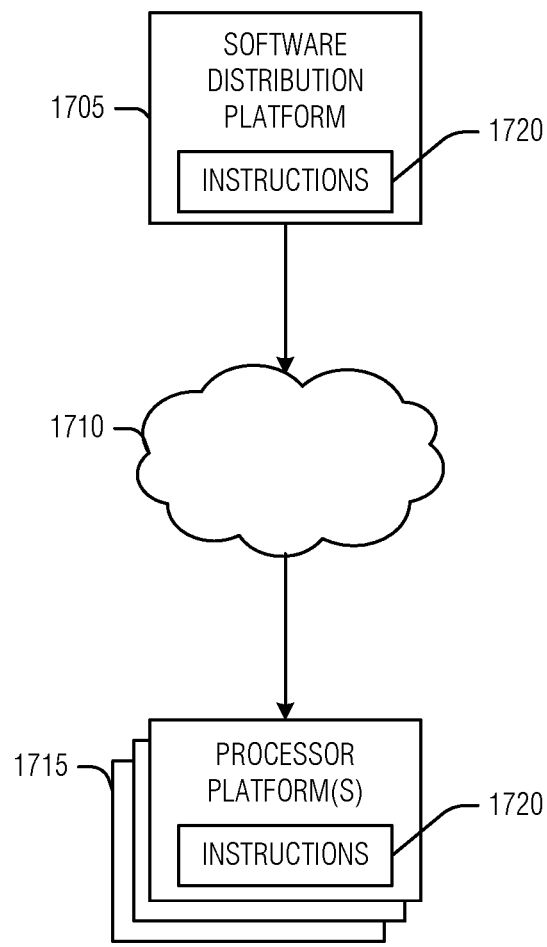
FIG. 17 illustrates an example software distribution platform 1105 to distribute software

FIG. 17 illustrates an example software distribution platform 1705 to distribute software, such as the example computer readable instructions 1720, to one or more devices, such as example processor platform(s) or connected edge devices. The example software distribution platform 1705 may be implemented by any computer server, data facility, cloud service, etc., capable of storing and transmitting (e.g., via a network 1710) software to other computing devices (e.g., third parties). Example connected Edge devices 1715 may be customers, clients, managing devices (e.g., servers), third parties (e.g., customers of an entity owning or operating the software distribution platform 1705). Example connected Edge devices 1715 may operate in commercial or home automation environments. In some examples, a third party is a developer, a seller, or a licensor of software such as the example computer readable instructions 1720. The third parties may be consumers, users, retailers, OEMs, etc., that purchase or license the software for use or re-sale or sub-licensing. In some examples, distributed software causes display of one or more user interfaces (UIs) or graphical user interfaces (GUIs) to identify the one or more devices (e.g., connected Edge devices 1715) geographically or logically separated from each other (e.g., physically separated IoT devices chartered with the responsibility of water distribution control (e.g., pumps), electricity distribution control (e.g., relays), etc.).

In the illustrated example of FIG. 17, the software distribution platform 1705 includes one or more servers and one or more storage devices. The storage devices store the computer readable instructions 1782, which may correspond to the example computer readable instructions described herein. The one or more servers of the example software distribution platform 1705 are in communication with a network 1710, which may correspond to any one or more of the Internet or any of the example networks described herein. In some examples, the one or more servers are responsive to requests to transmit the software to a requesting party as part of a commercial transaction. Payment for the delivery, sale, or license of the software may be handled by the one or more servers of the software distribution platform or via a third-party payment entity. The servers enable purchasers or licensors to download the computer readable instructions 1782 from the software distribution platform 1705. For example, the software, which may correspond to the example computer readable instructions discussed elsewhere herein, may be downloaded to the example processor platform(s) 1720 (e.g., example connected Edge devices), which are to execute the computer readable instructions 1782 to implement techniques described herein. In some examples, one or more servers of the software distribution platform 1705 are communicatively connected to one or more security domains or security devices through which requests and transmissions of the example computer readable instructions 1782 must pass. In some examples, one or more servers of the software distribution platform 1705 periodically offer, transmit, or force updates to the software (e.g., the example computer readable instructions 1782) to ensure improvements, patches, updates, etc., are distributed and applied to the software at the end user devices.

In the illustrated example of FIG. 17, the computer readable instructions 1782 are stored on storage devices of the software distribution platform 1705 in a particular format. A format of computer readable instructions includes, but is not limited to a particular code language (e.g., Java, JavaScript, Python, C, C#, SQL, HTML, etc.), or a particular code state (e.g., uncompiled code (e.g., ASCII), interpreted code, linked code, executable code (e.g., a binary), etc.). In some examples, the computer readable instructions 1782 stored in the software distribution platform 1705 are in a first format when transmitted to the example processor platform(s) 1720. In some examples, the first format is an executable binary in which particular types of the processor platform(s) 1720 can execute. However, in some examples, the first format is uncompiled code that requires one or more preparation tasks to transform the first format to a second format to enable execution on the example processor platform(s) 1720. For instance, the receiving processor platform(s) 1720 may need to compile the computer readable instructions 1782 in the first format to generate executable code in a second format that is capable of being executed on the processor platform(s) 1720. In still other examples, the first format is interpreted code that, upon reaching the processor platform(s) 1720, is interpreted by an interpreter to facilitate execution of instructions.

Figure 18:
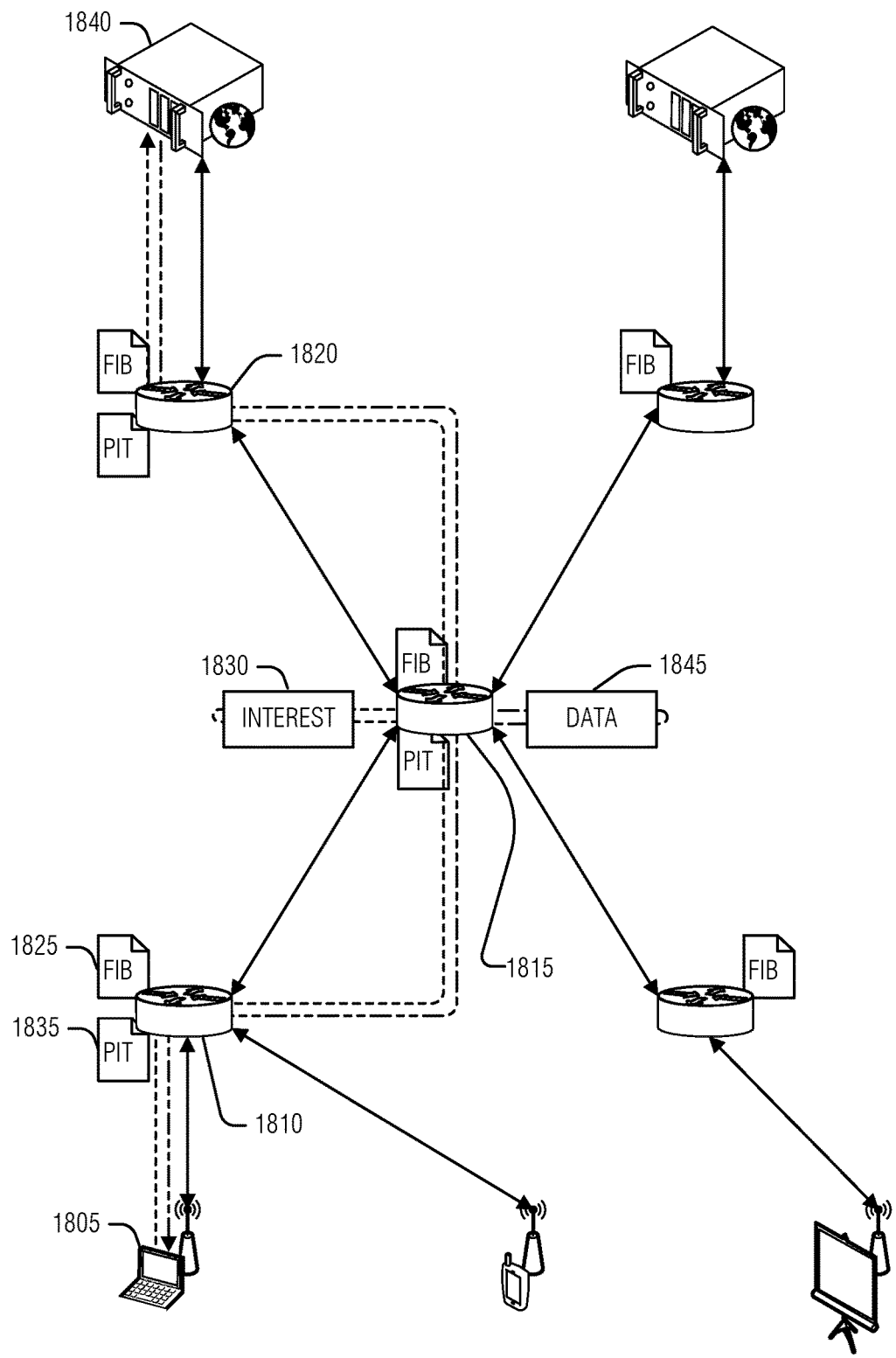
FIG. 18 illustrates an example information centric network (ICN), according to an example.

FIG. 18 illustrates an example information centric network (ICN), according to an embodiment. ICNs operate differently than traditional host-based (e.g., address-based) communication networks. ICN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 1805 (e.g., subscriber) requests named content from the network itself. The content request may be called an interest and transmitted via an interest packet 1830. As the interest packet traverses network devices (e.g., network elements, routers, switches, hubs, etc.)—such as network elements 1810, 1815, and 1820—a record of the interest is kept, for example, in a pending interest table (PIT) at each network element. Thus, network element 1810 maintains an entry in its PIT 1835 for the interest packet 1830, network element 1815 maintains the entry in its PIT, and network element 1820 maintains the entry in its PIT.

When a device, such as publisher 1840, that has content matching the name in the interest packet 1830 is encountered, that device 1840 may send a data packet 1845 in response to the interest packet 1830. Typically, the data packet 1845 is tracked back through the network to the source (e.g., device 1805) by following the traces of the interest packet 1830 left in the network element PITs. Thus, the PIT 1835 at each network element establishes a trail back to the subscriber 1805 for the data packet 1845 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 1830 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 1830 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 1830 to data cached in the ICN element. Thus, for example, if the data 1845 named in the interest 1830 is cached in network element 1815, then the network element 1815 will return the data 1845 to the subscriber 1805 via the network element 1810. However, if the data 1845 is not cached at network element 1815, the network element 1815 routes the interest 1830 on (e.g., to network element 1820). To facilitate routing, the network elements may use a forwarding information base 1825 (FIB) to match named data to an interface (e.g., physical port) for the route. Thus, the FIB 1825 operates much like a routing table on a traditional network device.

In an example, additional meta-data may be attached to the interest packet 1830, the cached data, or the route (e.g., in the FIB 1825), to provide an additional level of matching. For example, the data name may be specified as "www.somedomain.com or videos or v8675309," but also include a version number—or timestamp, time range, endorsement, etc. In this example, the interest packet 1830 may specify the desired name, the version number, or the version range. The matching may then locate routes or cached data matching the name and perform the additional comparison of meta-data or the like to arrive at an ultimate decision as to whether data or a route matches the interest packet 1830 for respectively responding to the interest packet 1830 with the data packet 1845 or forwarding the interest packet 1830.

ICN has advantages over host-based networking because the data segments are individually named. This enables aggressive caching throughout the network as a network element may provide a data packet 1830 in response to an interest 1830 as easily as an original author 1840. Accordingly, it is less likely that the same segment of the network will transmit duplicates of the same data requested by different devices.

Fine grained encryption is another feature of many ICN networks. A typical data packet 1845 includes a name for the data that matches the name in the interest packet 1830. Further, the data packet 1845 includes the requested data and may include additional information to filter similarly named data (e.g., by creation time, expiration time, version, etc.). To address malicious entities providing false information under the same name, the data packet 1845 may also encrypt its contents with a publisher key or provide a cryptographic hash of the data and the name. Thus, knowing the key (e.g., from a certificate of an expected publisher 1840) enables the recipient to ascertain whether the data is from that publisher 1840. This technique also facilitates the aggressive caching of the data packets 1845 throughout the network because each data packet 1845 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 19:
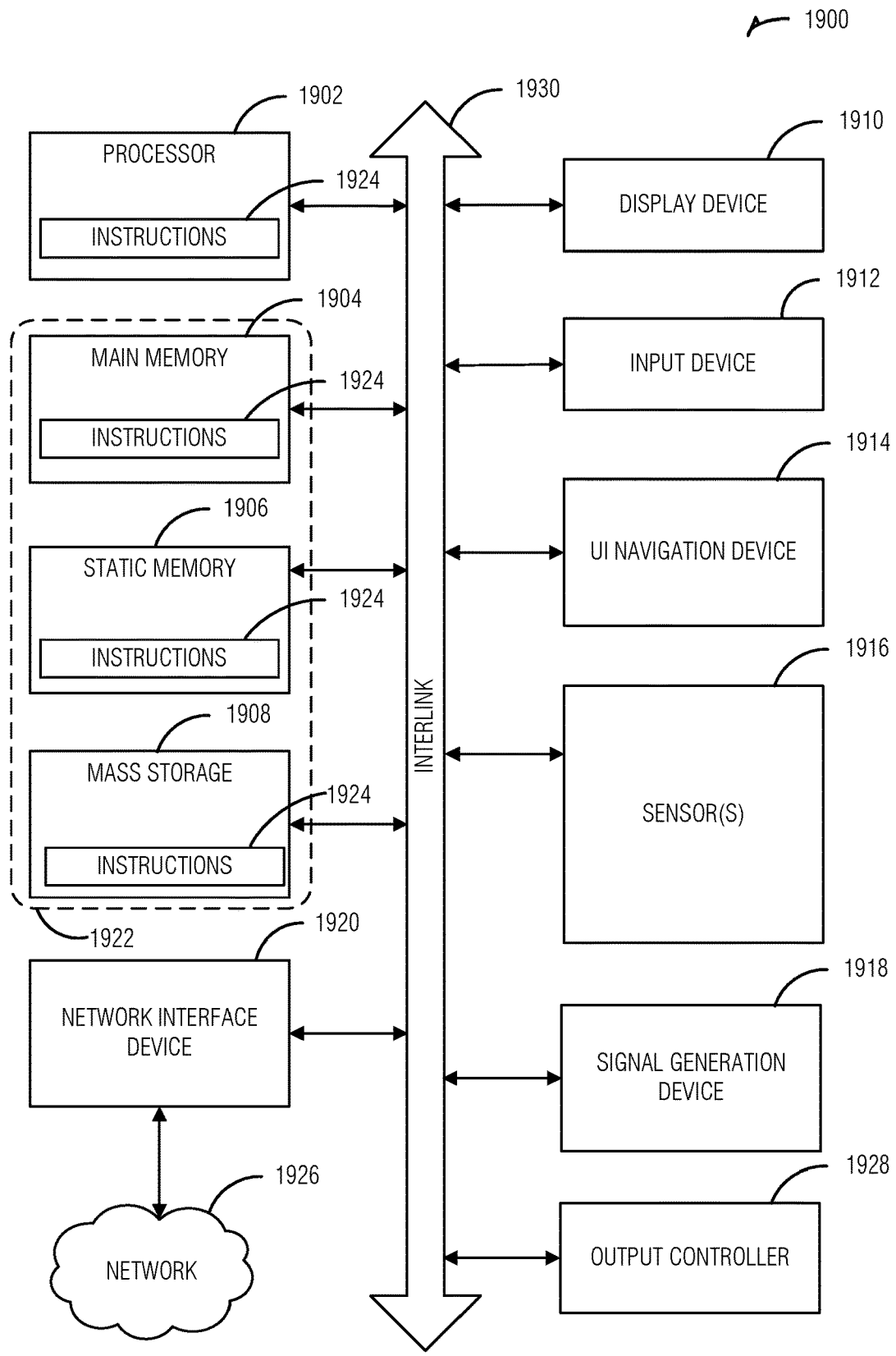
FIG. 19 is a block diagram illustrating an example of a machine upon which one or more embodiments may be implemented.

FIG. 19 illustrates a block diagram of an example machine 1900 upon which any one or more of the techniques (e.g., methodologies) discussed herein may perform. Examples, as described herein, may include, or may operate by, logic or a number of components, or mechanisms in the machine 1900. Circuitry (e.g., processing circuitry) is a collection of circuits implemented in tangible entities of the machine 1900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1900 follow.

In alternative embodiments, the machine 1900 may operate as a standalone device or may be connected (e.g., networked) to other machines. In a networked deployment, the machine 1900 may operate in the capacity of a server machine, a client machine, or both in server-client network environments. In an example, the machine 1900 may act as a peer machine in peer-to-peer (P2P) (or other distributed) network environment. The machine 1900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1900 may include a hardware processor 1902 (e.g., a central processing unit (CPU), a graphics processing unit (GPU), a hardware processor core, or any combination thereof), a main memory 1904, a static memory (e.g., memory or storage for firmware, microcode, a basic-input-output (BIOS), unified extensible firmware interface (UEFI), etc.) 1906, and mass storage 1908 (e.g., hard drives, tape drives, flash storage, or other block devices) some or all of which may communicate with each other via an interlink (e.g., bus) 1930. The machine 1900 may further include a display unit 1910, an alphanumeric input device 1912 (e.g., a keyboard), and a user interface (UI) navigation device 1914 (e.g., a mouse). In an example, the display unit 1910, input device 1912 and UI navigation device 1914 may be a touch screen display. The machine 1900 may additionally include a storage device (e.g., drive unit) 1908, a signal generation device 1918 (e.g., a speaker), a network interface device 1920, and one or more sensors 1916, such as a global positioning system (GPS) sensor, compass, accelerometer, or other sensor. The machine 1900 may include an output controller 1928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1902, the main memory 1904, the static memory 1906, or the mass storage 1908 may be, or include, a machine readable medium 1922 on which is stored one or more sets of data structures or instructions 1924 (e.g., software) embodying or utilized by any one or more of the techniques or functions described herein. The instructions 1924 may also reside, completely or at least partially, within any of registers of the processor 1902, the main memory 1904, the static memory 1906, or the mass storage 1908 during execution thereof by the machine 1900. In an example, one or any combination of the hardware processor 1902, the main memory 1904, the static memory 1906, or the mass storage 1908 may constitute the machine readable media 1922. While the machine readable medium 1922 is illustrated as a single medium, the term "machine readable medium" may include a single medium or multiple media (e.g., a centralized or distributed database, and/or associated caches and servers) configured to store the one or more instructions 1924.

The term "machine readable medium" may include any medium that is capable of storing, encoding, or carrying instructions for execution by the machine 1900 and that cause the machine 1900 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1922 may be representative of the instructions 1924, such as instructions 1924 themselves or a format from which the instructions 1924 may be derived. This format from which the instructions 1924 may be derived may include source code, encoded instructions (e.g., in compressed or encrypted form), packaged instructions (e.g., split into multiple packages), or the like. The information representative of the instructions 1924 in the machine readable medium 1922 may be processed by processing circuitry into the instructions to implement any of the operations discussed herein. For example, deriving the instructions 1924 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1924.

In an example, the derivation of the instructions 1924 may include assembly, compilation, or interpretation of the information (e.g., by the processing circuitry) to create the instructions 1924 from some intermediate or preprocessed format provided by the machine readable medium 1922. The information, when provided in multiple parts, may be combined, unpacked, and modified to create the instructions 1924. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1924 may be further transmitted or received over a communications network 1926 using a transmission medium via the network interface device 1920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.16 family of standards, IEEE 802.15.4 family of standards, peer-to-peer (P2P) networks, among others. In an example, the network interface device 1920 may include one or more physical jacks (e.g., Ethernet, coaxial, or phone jacks) or one or more antennas to connect to the communications network 1926. In an example, the network interface device 1920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1900, and includes digital or analog communications signals or other intangible medium to facilitate communication of such software. A transmission medium is a machine readable medium.

FIG. 19 illustrates a block diagram of an example machine 1900 upon which any one or more of the techniques (e.g., methodologies) discussed herein may perform. Examples, as described herein, may include, or may operate by, logic or a number of components, or mechanisms in the machine 1900. Circuitry (e.g., processing circuitry) is a collection of circuits implemented in tangible entities of the machine 1900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1900 follow.

In alternative embodiments, the machine 1900 may operate as a standalone device or may be connected (e.g., networked) to other machines. In a networked deployment, the machine 1900 may operate in the capacity of a server machine, a client machine, or both in server-client network environments. In an example, the machine 1900 may act as a peer machine in peer-to-peer (P2P) (or other distributed) network environment. The machine 1900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1900 may include a hardware processor 1902 (e.g., a central processing unit (CPU), a graphics processing unit (GPU), a hardware processor core, or any combination thereof), a main memory 1904, a static memory (e.g., memory or storage for firmware, microcode, a basic-input-output (BIOS), unified extensible firmware interface (UEFI), etc.) 1906, and mass storage 1908 (e.g., hard drives, tape drives, flash storage, or other block devices) some or all of which may communicate with each other via an interlink (e.g., bus) 1930. The machine 1900 may further include a display unit 1910, an alphanumeric input device 1912 (e.g., a keyboard), and a user interface (UI) navigation device 1914 (e.g., a mouse). In an example, the display unit 1910, input device 1912 and UI navigation device 1914 may be a touch screen display. The machine 1900 may additionally include a storage device (e.g., drive unit) 1908, a signal generation device 1918 (e.g., a speaker), a network interface device 1920, and one or more sensors 1916, such as a global positioning system (GPS) sensor, compass, accelerometer, or other sensor. The machine 1900 may include an output controller 1928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1902, the main memory 1904, the static memory 1906, or the mass storage 1908 may be, or include, a machine readable medium 1922 on which is stored one or more sets of data structures or instructions 1924 (e.g., software) embodying or utilized by any one or more of the techniques or functions described herein. The instructions 1924 may also reside, completely or at least partially, within any of registers of the processor 1902, the main memory 1904, the static memory 1906, or the mass storage 1908 during execution thereof by the machine 1900. In an example, one or any combination of the hardware processor 1902, the main memory 1904, the static memory 1906, or the mass storage 1908 may constitute the machine readable media 1922. While the machine readable medium 1922 is illustrated as a single medium, the term "machine readable medium" may include a single medium or multiple media (e.g., a centralized or distributed database, and/or associated caches and servers) configured to store the one or more instructions 1924.

The term "machine readable medium" may include any medium that is capable of storing, encoding, or carrying instructions for execution by the machine 1900 and that cause the machine 1900 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1922 may be representative of the instructions 1924, such as instructions 1924 themselves or a format from which the instructions 1924 may be derived. This format from which the instructions 1924 may be derived may include source code, encoded instructions (e.g., in compressed or encrypted form), packaged instructions (e.g., split into multiple packages), or the like. The information representative of the instructions 1924 in the machine readable medium 1922 may be processed by processing circuitry into the instructions to implement any of the operations discussed herein. For example, deriving the instructions 1924 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1924.

In an example, the derivation of the instructions 1924 may include assembly, compilation, or interpretation of the information (e.g., by the processing circuitry) to create the instructions 1924 from some intermediate or preprocessed format provided by the machine readable medium 1922. The information, when provided in multiple parts, may be combined, unpacked, and modified to create the instructions 1924. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1924 may be further transmitted or received over a communications network 1926 using a transmission medium via the network interface device 1920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 1920 may include one or more physical jacks (e.g., Ethernet, coaxial, or phone jacks) or one or more antennas to connect to the communications network 1926. In an example, the network interface device 1920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1900, and includes digital or analog communications signals or other intangible medium to facilitate communication of such software. A transmission medium is a machine readable medium.

Additional Notes & Examples

Example 1 is an Information Centric Network (ICN) node for ICN distributed path selection, the ICN node comprising: a set of network interfaces; and processing circuitry configured to: transmit, via the set of network interfaces, a probe message to other ICN nodes; receive, via the set of network interfaces, a response to the probe message; derive a path strength metric from the response; receive, via the set of network interfaces, a discovery packet; and add the path strength metric to the discovery packet.

In Example 2, the subject matter of Example 1 includes, wherein, to derive the path strength metric, the processing circuitry is configured to: calculate a transmission success probability metric based on the response.

In Example 3, the subject matter of Example 2 includes, wherein, to calculate the transmission success probability metric, the processing circuitry is configured to: average successful transmission counts across multiple probe messages to a neighbor ICN node.

In Example 4, the subject matter of Example 3 includes, wherein the transmission success probability metric corresponds to a backward link from the neighbor ICN node to the ICN node.

In Example 5, the subject matter of Examples 3-4 includes, wherein the averaging is over a moving window time period.

In Example 6, the subject matter of Examples 1-5 includes, wherein, to derive the path strength metric, the processing circuitry is configured to: calculate an expected maximum transmission rate metric based on the response.

In Example 7, the subject matter of Example 6 includes, wherein, to calculate the expected maximum transmission rate metric, the processing circuitry is configured to: average channel realizations across multiple probe messages to a neighbor ICN node.

In Example 8, the subject matter of Example 7 includes, wherein the expected maximum transmission rate metric corresponds to a backward link from the neighbor ICN node to the ICN node.

In Example 9, the subject matter of Examples 7-8 includes, wherein the averaging is over a moving window time period.

In Example 10, the subject matter of Examples 1-9 includes, wherein, to derive the path strength metric, the processing circuitry is configured to: calculate a transmission success probability metric based on the response; calculate an expected maximum transmission rate metric based on the response; and combine the transmission success probability metric and the expected maximum transmission rate metric to create the path strength metric.

In Example 11, the subject matter of Example 10 includes, wherein, to combine the transmission success probability metric and the expected maximum transmission rate metric, the processing circuitry is configured to: use a Simple Additive Weighting (SAW).

In Example 12, the subject matter of Examples 1-11 includes, wherein, to add the path strength metric to the discovery packet, the processing circuitry is configured to: extract a path strength value from the discovery packet; add the path strength metric to the path strength value to create a modified path strength value; and replace the path strength value in the discovery packet with the modified path strength value.

Example 13 is a method for Information Centric Network (ICN) distributed path selection, the method comprising: transmitting, by an ICN node, a probe message to other ICN nodes; receiving, by the ICN node, a response to the probe message; deriving a path strength metric from the response; receiving a discovery packet; and adding the path strength metric to the discovery packet.

In Example 14, the subject matter of Example 13 includes, wherein deriving the path strength metric includes: calculating a transmission success probability metric based on the response.

In Example 15, the subject matter of Example 14 includes, wherein calculating the transmission success probability metric includes: averaging successful transmission counts across multiple probe messages to a neighbor ICN node.

In Example 16, the subject matter of Example 15 includes, wherein the transmission success probability metric corresponds to a backward link from the neighbor ICN node to the ICN node.

In Example 17, the subject matter of Examples 15-16 includes, wherein the averaging is over a moving window time period.

In Example 18, the subject matter of Examples 13-17 includes, wherein deriving the path strength metric includes: calculating an expected maximum transmission rate metric based on the response.

In Example 19, the subject matter of Example 18 includes, wherein calculating the expected maximum transmission rate metric includes: averaging channel realizations across multiple probe messages to a neighbor ICN node.

In Example 20, the subject matter of Example 19 includes, wherein the expected maximum transmission rate metric corresponds to a backward link from the neighbor ICN node to the ICN node.

In Example 21, the subject matter of Examples 19-20 includes, wherein the averaging is over a moving window time period.

In Example 22, the subject matter of Examples 13-21 includes, wherein deriving the path strength metric includes: calculating a transmission success probability metric based on the response; calculating an expected maximum transmission rate metric based on the response; and combining the transmission success probability metric and the expected maximum transmission rate metric to create the path strength metric.

In Example 23, the subject matter of Example 22 includes, wherein combining the transmission success probability metric and the expected maximum transmission rate metric includes: using a Simple Additive Weighting (SAW).

In Example 24, the subject matter of Examples 13-23 includes, wherein adding the path strength metric to the discovery packet includes: extracting a path strength value from the discovery packet; adding the path strength metric to the path strength value to create a modified path strength value; and replacing the path strength value in the discovery packet with the modified path strength value.

Example 25 is at least one machine readable medium including instructions for Information Centric Network (ICN) distributed path selection, the instructions, when executed by processing circuitry, cause the processing circuitry to perform operations comprising: transmitting, by an ICN node, a probe message to other ICN nodes; receiving, by the ICN node, a response to the probe message; deriving a path strength metric from the response; receiving a discovery packet; and adding the path strength metric to the discovery packet.

In Example 26, the subject matter of Example 25 includes, wherein deriving the path strength metric includes: calculating a transmission success probability metric based on the response.

In Example 27, the subject matter of Example 26 includes, wherein calculating the transmission success probability metric includes: averaging successful transmission counts across multiple probe messages to a neighbor ICN node.

In Example 28, the subject matter of Example 27 includes, wherein the transmission success probability metric corresponds to a backward link from the neighbor ICN node to the ICN node.

In Example 29, the subject matter of Examples 27-28 includes, wherein the averaging is over a moving window time period.

In Example 30, the subject matter of Examples 25-29 includes, wherein deriving the path strength metric includes: calculating an expected maximum transmission rate metric based on the response.

In Example 31, the subject matter of Example 30 includes, wherein calculating the expected maximum transmission rate metric includes: averaging channel realizations across multiple probe messages to a neighbor ICN node.

In Example 32, the subject matter of Example 31 includes, wherein the expected maximum transmission rate metric corresponds to a backward link from the neighbor ICN node to the ICN node.

In Example 33, the subject matter of Examples 31-32 includes, wherein the averaging is over a moving window time period.

In Example 34, the subject matter of Examples 25-33 includes, wherein deriving the path strength metric includes: calculating a transmission success probability metric based on the response; calculating an expected maximum transmission rate metric based on the response; and combining the transmission success probability metric and the expected maximum transmission rate metric to create the path strength metric.

In Example 35, the subject matter of Example 34 includes, wherein combining the transmission success probability metric and the expected maximum transmission rate metric includes: using a Simple Additive Weighting (SAW).

In Example 36, the subject matter of Examples 25-35 includes, wherein adding the path strength metric to the discovery packet includes: extracting a path strength value from the discovery packet; adding the path strength metric to the path strength value to create a modified path strength value; and replacing the path strength value in the discovery packet with the modified path strength value.

Example 37 is a system for Information Centric Network (ICN) distributed path selection, the system comprising: means for transmitting, by an ICN node, a probe message to other ICN nodes; means for receiving, by the ICN node, a response to the probe message; means for deriving a path strength metric from the response; means for receiving a discovery packet; and means for adding the path strength metric to the discovery packet.

In Example 38, the subject matter of Example 37 includes, wherein the means for deriving the path strength metric include: means for calculating a transmission success probability metric based on the response.

In Example 39, the subject matter of Example 38 includes, wherein the means for calculating the transmission success probability metric include: means for averaging successful transmission counts across multiple probe messages to a neighbor ICN node.

In Example 40, the subject matter of Example 39 includes, wherein the transmission success probability metric corresponds to a backward link from the neighbor ICN node to the ICN node.

In Example 41, the subject matter of Examples 39-40 includes, wherein the averaging is over a moving window time period.

In Example 42, the subject matter of Examples 37-41 includes, wherein the means for deriving the path strength metric include: means for calculating an expected maximum transmission rate metric based on the response.

In Example 43, the subject matter of Example 42 includes, wherein the means for calculating the expected maximum transmission rate metric include: means for averaging channel realizations across multiple probe messages to a neighbor ICN node.

In Example 44, the subject matter of Example 43 includes, wherein the expected maximum transmission rate metric corresponds to a backward link from the neighbor ICN node to the ICN node.

In Example 45, the subject matter of Examples 43-44 includes, wherein the averaging is over a moving window time period.

In Example 46, the subject matter of Examples 37-45 includes, wherein the means for deriving the path strength metric include: means for calculating a transmission success probability metric based on the response; means for calculating an expected maximum transmission rate metric based on the response; and means for combining the transmission success probability metric and the expected maximum transmission rate metric to create the path strength metric.

In Example 47, the subject matter of Example 46 includes, wherein the means for combining the transmission success probability metric and the expected maximum transmission rate metric include: means for using a Simple Additive Weighting (SAW).

In Example 48, the subject matter of Examples 37-47 includes, wherein the means for adding the path strength metric to the discovery packet include: means for extracting a path strength value from the discovery packet; means for adding the path strength metric to the path strength value to create a modified path strength value; and means for replacing the path strength value in the discovery packet with the modified path strength value.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 is a system to implement of any of Examples 1-48.

Example 52 is a method to implement of any of Examples 1-48.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An Information Centric Network (ICN) node for ICN distributed path selection, the ICN node comprising:
   a set of network interfaces; and
   processing circuitry configured to:
      transmit, via the set of network interfaces, a probe message to other ICN nodes, wherein the probe message is a broadcast to one or more one-hop neighbor ICN nodes, and wherein the probe message identifies itself as a probe message to measure a link characteristic for a one-hop link between the ICN node and one other ICN node in the one or more one-hop neighbor ICN nodes;
      receive, via the set of network interfaces, a response to the probe message;
      derive a path strength metric from the response;
      receive, via the set of network interfaces, a discovery packet, wherein the discovery packet is an ICN interest packet with a name or flag that indicates that the ICN interest packet is the discovery packet, wherein the discovery packet is an ICN request to locate a compute resource, wherein a node with the compute resource terminates transmission of the discovery packet and provides a discovery data packet in response to the discovery packet to indicate that the node has the compute resource, and wherein the discovery data packet is routed back to a generator of the discovery via packet pending interest table (PIT) entries of intervening nodes; and
      add the path strength metric to the discovery packet to be included in a discovery data packet sent from the node that has the compute resource in response to the discovery packet.

2. The ICN node of claim 1, wherein, to derive the path strength metric, the processing circuitry is configured to:
   calculate a transmission success probability metric based on the response.

3. The ICN node of claim 2, wherein, to calculate the transmission success probability metric, the processing circuitry is configured to:
   average successful transmission counts across multiple probe messages to a neighbor ICN node.

4. The ICN node of claim 3, wherein the transmission success probability metric corresponds to a backward link from the neighbor ICN node to the ICN node.

5. The ICN node of claim 3, wherein the averaging is over a moving window time period.

6. The ICN node of claim 1, wherein, to derive the path strength metric, the processing circuitry is configured to:
   calculate an expected maximum transmission rate metric based on the response.

7. The ICN node of claim 6, wherein, to calculate the expected maximum transmission rate metric, the processing circuitry is configured to:
   average channel realizations across multiple probe messages to a neighbor ICN node.

8. The ICN node of claim 7, wherein the expected maximum transmission rate metric corresponds to a backward link from the neighbor ICN node to the ICN node.

9. The ICN node of claim 7, wherein the averaging is over a moving window time period.

10. The ICN node of claim 1, wherein, to derive the path strength metric, the processing circuitry is configured to:
    calculate a transmission success probability metric based on the response;
    calculate an expected maximum transmission rate metric based on the response; and
    combine the transmission success probability metric and the expected maximum transmission rate metric to create the path strength metric.

11. The ICN node of claim 10, wherein, to combine the transmission success probability metric and the expected maximum transmission rate metric, the processing circuitry is configured to:
    use a Simple Additive Weighting (SAW).

12. The ICN node of claim 1, wherein, to add the path strength metric to the discovery packet, the processing circuitry is configured to:
extract a path strength value from the discovery packet;
add the path strength metric to the path strength value to create a modified path strength value; and
replace the path strength value in the discovery packet with the modified path strength value.

13. At least one non-transitory machine readable medium including instructions for Information Centric Network (ICN) distributed path selection, the instructions, when executed by processing circuitry, cause the processing circuitry to perform operations comprising:
transmitting, by an ICN node, a probe message to other ICN nodes, wherein the probe message is a broadcast to one or more one-hop neighbor ICN nodes, and wherein the probe message identifies itself as a probe message to measure a link characteristic for a one-hop link between the ICN node and one other ICN node in the one or more one-hop neighbor ICN nodes;
receiving, by the ICN node, a response to the probe message;
deriving a path strength metric from the response;
receiving a discovery packet, wherein the discovery packet is an ICN interest packet with a name or flag that indicates that the ICN interest packet is the discovery packet, wherein the discovery packet is an ICN request to locate a compute resource, wherein a node with the compute resource terminates transmission of the discovery packet and provides a discovery data packet in response to the discovery packet to indicate that the node has the compute resource, and wherein the discovery data packet is routed back to a generator of the discovery via packet pending interest table (PIT) entries of intervening nodes; and
adding the path strength metric to the discovery packet to be included in a discovery data packet sent from the node that has the compute resource in response to the discovery packet.

14. The at least one non-transitory machine readable medium of claim 13, wherein deriving the path strength metric includes:
calculating a transmission success probability metric based on the response.

15. The at least one non-transitory machine readable medium of claim 14, wherein calculating the transmission success probability metric includes:
averaging successful transmission counts across multiple probe messages to a neighbor ICN node.

16. The at least one non-transitory machine readable medium of claim 15, wherein the transmission success probability metric corresponds to a backward link from the neighbor ICN node to the ICN node.

17. The at least one non-transitory machine readable medium of claim 15, wherein the averaging is over a moving window time period.

18. The at least one non-transitory machine readable medium of claim 13, wherein deriving the path strength metric includes:
calculating an expected maximum transmission rate metric based on the response.

19. The at least one non-transitory machine readable medium of claim 18, wherein calculating the expected maximum transmission rate metric includes:
averaging channel realizations across multiple probe messages to a neighbor ICN node.

20. The at least one non-transitory machine readable medium of claim 19, wherein the expected maximum transmission rate metric corresponds to a backward link from the neighbor ICN node to the ICN node.

21. The at least one non-transitory machine readable medium of claim 19, wherein the averaging is over a moving window time period.

22. The at least one non-transitory machine readable medium of claim 13, wherein deriving the path strength metric includes:
calculating a transmission success probability metric based on the response;
calculating an expected maximum transmission rate metric based on the response; and
combining the transmission success probability metric and the expected maximum transmission rate metric to create the path strength metric.

23. The at least one non-transitory machine readable medium of claim 22, wherein combining the transmission success probability metric and the expected maximum transmission rate metric includes:
using a Simple Additive Weighting (SAW).

24. The at least one non-transitory machine readable medium of claim 13, wherein adding the path strength metric to the discovery packet includes:
extracting a path strength value from the discovery packet;
adding the path strength metric to the path strength value to create a modified path strength value; and
replacing the path strength value in the discovery packet with the modified path strength value.

* * * * *